(12) United States Patent
Cili

(10) Patent No.: US 9,071,997 B2
(45) Date of Patent: Jun. 30, 2015

(54) METHODS AND SYSTEMS FOR ADAPTIVE CHANNEL ESTIMATION/PREDICTION FILTER DESIGN

(71) Applicant: Apple Inc., Cupertino, CA (US)

(72) Inventor: Gencer Cili, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/948,108

(22) Filed: Jul. 22, 2013

(65) Prior Publication Data

US 2014/0022924 A1     Jan. 23, 2014

Related U.S. Application Data

(60) Provisional application No. 61/674,854, filed on Jul. 24, 2012, provisional application No. 61/674,852, filed on Jul. 23, 2012.

(51) Int. Cl.
| G01R 31/08 | (2006.01) |
| H04W 24/08 | (2009.01) |
| H04W 48/16 | (2009.01) |
| H04L 25/02 | (2006.01) |
| H04W 48/20 | (2009.01) |

(52) U.S. Cl.
CPC ............. *H04W 24/08* (2013.01); *H04W 48/16* (2013.01); *H04W 48/20* (2013.01); *H04L 25/0204* (2013.01); *H04L 25/0222* (2013.01)

(58) Field of Classification Search
CPC  H04L 25/0204; H04L 25/0222; H04W 48/20
See application file for complete search history.

(56) References Cited

U.S. PATENT DOCUMENTS 6,810,246 B1 * 10/2004 Kalofonos et al. ............ 455/423
6,980,781 B2    12/2005 Dibuduo (Continued)

FOREIGN PATENT DOCUMENTS

KR   1020070112417   11/2007
WO   WO2011060566    5/2011

(Continued)

OTHER PUBLICATIONS

International Search Report and Written Opinion in PCT Application PCT/US2013/051547, dated Nov. 13, 2013.

(Continued)

*Primary Examiner* — David Oveissi
(74) *Attorney, Agent, or Firm* — Downey Brand LLP

(57) ABSTRACT

A method to adapt a set of multi-point channel estimation filters for use in wireless communications including measuring a plurality of reception values is provided. Each reception value included in the plurality of reception values is associated with one of the network nodes. The method includes sorting the plurality of reception values according to magnitude and determining a select reception value. The method includes selecting a particular network node from the set of network nodes based on the reception value. The reception value is within a threshold from the select reception value. The method includes adjusting the length of a multi-point channel estimation filter associated with the particular network node. The adjusting the length is based on a lookup table and on the reception value associated with the particular network node, according to some embodiments. User equipment in a wireless network adapted for the above method is also provided.

20 Claims, 16 Drawing Sheets

(56) References Cited

U.S. PATENT DOCUMENTS

| | | | |
|---|---|---|---|
| 7,848,463 | B2 | 12/2010 | Li et al. |
| 2005/0036537 | A1 | 2/2005 | Zancho et al. |
| 2006/0209932 | A1 | 9/2006 | Khandekar et al. |
| 2007/0258600 | A1* | 11/2007 | Cleveland et al. ......... 381/71.11 |
| 2008/0159458 | A1* | 7/2008 | Cheng et al. .................. 375/358 |
| 2008/0207134 | A1 | 8/2008 | Sebire et al. |
| 2010/0103834 | A1 | 4/2010 | Gorokhov et al. |
| 2010/0158176 | A1* | 6/2010 | Luo et al. ...................... 375/350 |
| 2010/0278284 | A1* | 11/2010 | Abrishamkar et al. ....... 375/320 |
| 2011/0306350 | A1 | 12/2011 | Barbieri et al. |
| 2012/0027048 | A1 | 2/2012 | Lindoff et al. |
| 2012/0033571 | A1 | 2/2012 | Shimezawa et al. |
| 2012/0113953 | A1 | 5/2012 | Papadopoulos et al. |
| 2012/0275327 | A1 | 11/2012 | Zangi et al. |
| 2012/0307704 | A1 | 12/2012 | Roman et al. |
| 2013/0084866 | A1* | 4/2013 | Martin et al. ................. 455/436 |
| 2013/0114658 | A1 | 5/2013 | Davydov et al. |

FOREIGN PATENT DOCUMENTS

| | | | |
|---|---|---|---|
| WO | 2013/057047 | A1 | 4/2013 |
| WO | 2013/074025 | A2 | 5/2013 |

OTHER PUBLICATIONS

"Uplink Power Control: Accuracy Aspects", Siemens, 3GPP TSG RAN WG1#48, R1-071052, St. Louis, MO, Feb. 12-16, 2007, 7 pages.

G. Cili, H. Yanikomeroglu, and F. R. Yu, "Cell switch off technique combined with coordinated multi-point (CoMP) transmission for energy efficiency in beyond-LTE cellular networks," in Proc. IEEE ICC'12 Workshops, Ottawa, ON, Canada, Jun. 2012. 5 pages.

G. Cili, H. Yanikomeroglu, and F. R. Yu, "Coordinated Multi-Point (CoMP) adaptive estimation and prediction schemes using superimposed and decomposed channel tracking," accepted to IEEE ICC'13 Workshops, Budapest, Hungary, Jun. 2013. pp. 1-6.

D. Lee, B. Clerckx, E. Hardouin, D. Mazzarese, S. Nagata, K. Sayana, "Coordinated Multipoint Transmission and Reception in LTE-Advanced: Deployment Scenarios and Operational Challenges", IEEE Communications Magazine, Feb. 2012, pp. 148-155.

G. Cili, "Coordinated Multi-Point Transmission Aided Cell Switch Off Schemes for Energy Efficient Mobile Cellular Networks," M.S. Thesis, Dept. of Systems and Computer Engineering, Carleton University, Ottawa, Ontario, Canada, Sep. 2012. 101 pages.

M. Baker, "LTE-Advanced Physical Layer" 3GPP A Global Initiative, REV-090034r1 IMT-Advanced Evaluation Workshop, Bejing, Dec. 17-18, 2009. pp. 1-48.

* cited by examiner

METHODS AND SYSTEMS FOR ADAPTIVE CHANNEL ESTIMATION/PREDICTION FILTER DESIGN

CROSS-REFERENCE TO RELATED APPLICATIONS

This application claims the benefit of U.S. Provisional Application No. 61/674,854, entitled "UE ANCHORED DOWN-SELECTION FOR CoMP JOINT TRANSMISSION CLUSTER," by Gencer Cili, filed on Jul. 24, 2012, and U.S. Provisional Application No. 61/674,852, entitled "CoMP ADAPTIVE CHANNEL ESTIMATION/PREDICTION FILTER DESIGN," by Gencer Cili, filed on Jul. 23, 2012, the contents of which are hereby incorporated by reference in their entirety, for all purposes.

This application is related to U.S. patent application Ser. No. 13/948,113, entitled "METHODS AND SYSTEMS FOR ANCHORED DOWN-SELECTION IN A COORDINATED MULTIPOINT TRANSMISSION CLUSTER," by Gencer Cili, filed on Jul. 22, 2013, the contents of which are hereby incorporated by reference in their entirety, for all purposes.

FIELD OF THE DESCRIBED EMBODIMENTS

The described embodiments relate generally to methods, devices, and systems for wireless communications, and more particularly to selecting members of a transmission cluster and designing filters for Coordinated Multipoint (CoMP) transmission schemes.

BACKGROUND

In the field of wireless communications, performance of downlink (DL) transmission between network nodes and mobile User Equipment (UE) devices is paramount to maintain market share. Performance of a DL transmission Coordinated Multipoint (CoMP) scheme depends on the transmission set clustering accuracy. Inaccuracies in transmission set clustering decisions can cause a degradation of user quality of service, e.g., in terms of downlink capacity. Inaccuracies in transmission set clustering decisions can also result in overall access network energy inefficiency. Channel estimation errors and CoMP system delays can cause inaccurate Channel Status Information (CSI) feedback and can contribute to inaccurate clustering decisions at the serving evolved Node B (eNB). In fact, UEs with higher clustering degrees can be affected more severely than UEs with lower clustering degrees by channel estimation errors and system delays. This degradation can translate into frustrated users due to a large number of dropped or low quality calls. An issue typically encountered due to estimation errors and network delays can include inaccurate CSI feedback that results in the exclusion of a potential transmission point from the CoMP cluster. This exclusion decreases the energy efficiency of the access network and degrades the user perceived quality of service in terms of data rates. Another problem resulting from inaccurate transmission clustering decision can include the use of inadequate (e.g., poor signal quality) nodes in the CoMP transmission cluster. While this inclusion can increase downlink data rates slightly, it can cause significant bits/Joule energy efficiency losses for the access network. The increased power consumption of the access network by the addition of an inadequate node may not yield corresponding capacity gains at the user side. Moreover, channel estimation filter length can be unduly increased for less CoMP dependent UEs. This increased filter length makes the computation of network operations unnecessarily complex.

One approach to resolve the above problems is to use the same filter length for all channels between the UE and the nodes in the CoMP measurement set. However, this approach unnecessarily increases computation complexity, especially for nodes that are less likely to be included in a CoMP transmission set.

Therefore, selection of CoMP transmission sets and channel estimation filters can be improved upon.

SUMMARY OF THE DESCRIBED EMBODIMENTS

According to a first embodiment, a method to adapt a set of multi-point channel estimation filters for use in wireless communications includes measuring a plurality of reception values for signals received from a set of two or more network nodes, at a wireless communication device. Each reception value may be included in the plurality of reception values associated with one of the network nodes in the set of two or more network nodes. The method may also include sorting the plurality of reception values according to magnitude and determining a select reception value. And selecting a particular network node from the set of two or more network nodes based on the reception value associated with the particular network node. For example, the reception value may be within a threshold from the select reception value. In some embodiments, the method includes adjusting the length of a multi-point channel estimation filter associated with the particular network node. The adjusting the length is based on a lookup table and on the reception value associated with the particular network node, according to some embodiments.

In a second embodiment, a method to adapt a filter length for a set of channel estimation filters for use in wireless communications is disclosed. The method includes tracking a plurality of network nodes in a joint transmission set and providing a two dimensional circular buffer for storing reception values for signals received from the plurality of network nodes in the joint transmission set over a time window. The method may further include determining a moving average of the stored reception values for a particular network node included in the joint transmission set. And determining one or more transmission time intervals (TTIs) for each network node actively participating in at least a previous joint transmission set. In some embodiments, the method also includes adapting a filter length for the particular network node in the joint transmission set based on the moving average of the stored reception values.

In a third embodiment, a user equipment in a wireless network is disclosed. The user equipment has wireless circuitry including a receiver, a transmitter, and a memory circuit storing data and commands. The user equipment may also include a processor circuit configured to execute commands stored in the memory circuit. Thus, when executing commands stored in the memory circuit, the processor circuit causes the receiver to receive an information message from a network serving node, the information message comprising a list of a plurality of measurement nodes in the wireless network. The processor circuit also performs a plurality of measurements on signals received from one or more network nodes in the plurality of measurement nodes, and selects a plurality of transmission nodes from the plurality of measurement nodes. In some embodiments, the processor circuit selects a plurality of filter lengths for each transmission node in the plurality of transmission nodes.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments can be better understood by reference to the following description and the accompanying drawings. Additionally, advantages of the described embodiments can be better understood by reference to the following description and accompanying drawings. These drawings do not limit any changes in form and detail that can be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Figure 1A:
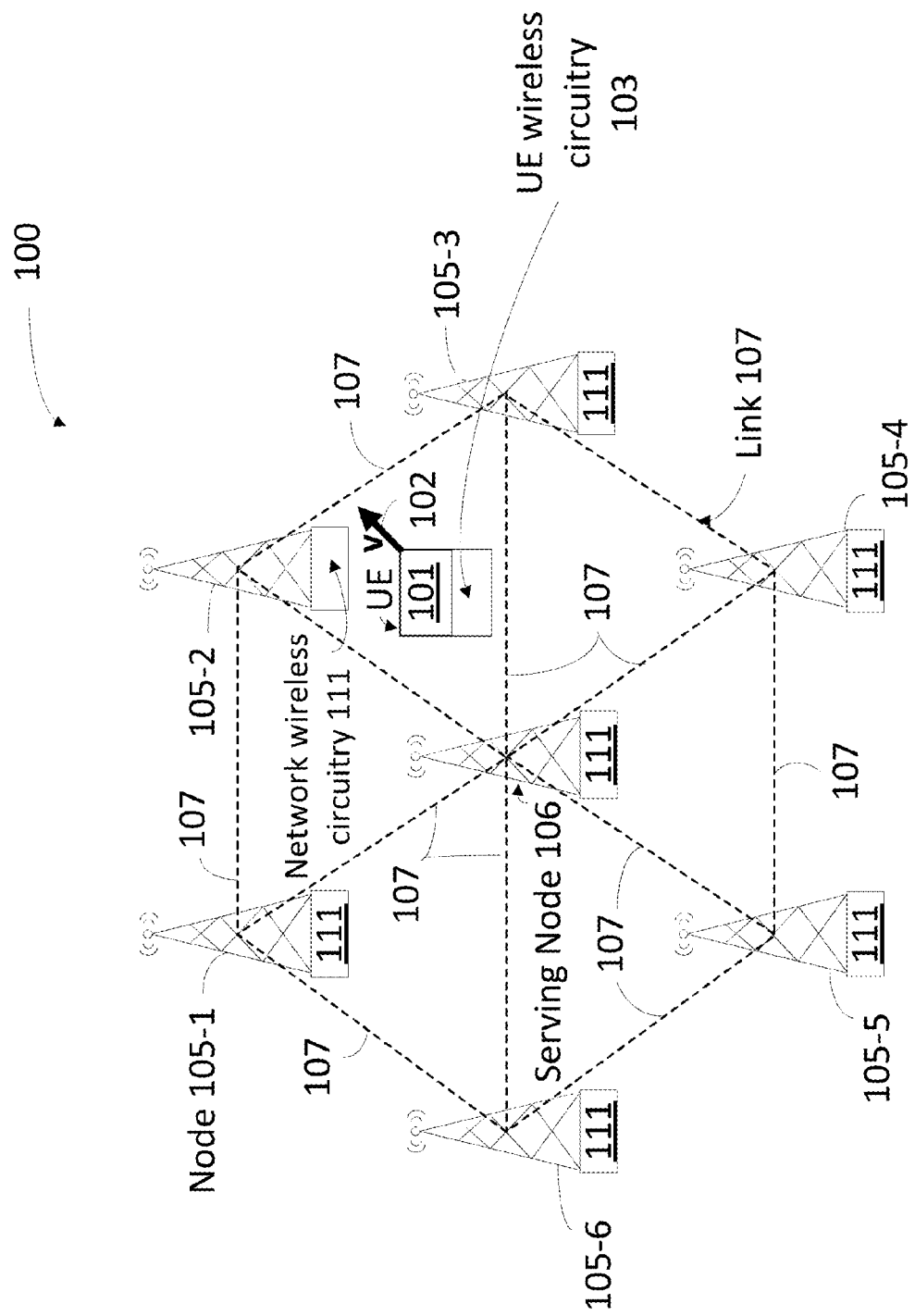
FIG. 1A illustrates a partial view of a network for a downlink transmission scheme according to some embodiments.

In wireless telecommunications, a Downlink Coordinated Multipoint (DL-CoMP) transmission scheme is defined as multiple geographically separated points coordinating in terms of scheduling decisions and performing joint user plane data (payload) transmission to the UE. In DL-CoMP transmission, the multiple geographically separated points can belong to different physical cells in the network. Uplink CoMP transmission schemes for data transmission can also be implemented, but these can be transparent from the point of view of the UE, since receiver processing at the network side can be performed without altering UE wireless processing. Transmission to the UE includes time/frequency resources called Resource Blocks, following a $3^{rd}$ Generation Partnership Project (3GPP) Release 11 (and future versions as well). Resource blocks can include a plurality of resource elements organized in sub-frames. In CoMP operation, multiple points (e.g., network nodes) coordinate with each other so that transmission signals to and from different points do not incur serious interference. The spatial separation between the cooperating points may decrease the received spatial interference of the payload at the UE. Moreover, in some configurations, different points can cooperate to generate a meaningful signal or payload, transmitted to the UE. In that regard, DL-CoMP transmission is a technique that enables high quality data transmission in networks having limited bandwidth or increased usage demand. Indeed, the ability of DL-CoMP transmission to mitigate inter-cell interference is a desirable quality. Many deployment schemes have been suggested for implementing DL-CoMP transmission. Inter-node coordination is a scheme whose performance relies on X2 links between the network nodes. This approach tends to put excessive computational and bandwidth demand on the network, leading to potentially catastrophic failures when a given network node malfunctions. Embodiments of the present disclosure include a DL-CoMP transmission scheme that places an active role on the UE for selecting the transmission set. In some embodiments of the present disclosure, multi-point channel estimation/prediction filters at the UE are adjusted according to UE measured parameters regarding nodes in a CoMP transmission set provided by a serving node. Further according to some embodiments, a transmission set clustering accuracy is determined by a multi-point Channel Status Information (CSI) feedback, provided by the User Equipment (UE).

Embodiments consistent with the present disclosure include a method to adapt a set of multi-point channel estimation filters for use in wireless communications. The method includes measuring a plurality of reception values for signals received from a set of two or more network nodes, at a wireless communication device. Accordingly, a reception value may be included in the plurality of reception values associated with one of the network nodes in the set of two or more network nodes. The method may also include sorting the plurality of reception values according to magnitude, and determining a select reception value. For example, the select reception value may be the largest value within the plurality of reception values. The method includes selecting a particular network node from the set of two or more network nodes based on the reception value associated with the particular network node. For example, the reception value may be within a threshold from the select reception value. In some embodiments, the method includes adjusting the length of a multi-point channel estimation filter associated with the particular network node. The adjusting the length is based on a lookup table and on the reception value associated with the particular network node, according to some embodiments.

In some embodiments a method to adapt a filter length for a set of channel estimation filters for use in wireless communications includes tracking a plurality of network nodes in a joint transmission set. The method may include providing a two dimensional circular buffer for storing reception values for signals received from the plurality of network nodes, over a time window. The method may further include determining a moving average of the stored reception values for a particular network node included in the joint transmission set. And determining one or more transmission time intervals (TTIs) for each network node actively participating in at least a previous joint transmission set. In some embodiments, the method also includes adapting a filter length for the particular network node in the joint transmission set. Accordingly, in some embodiments the adapting a filter length is based on the moving average of the stored reception values.

In yet other embodiments, a user equipment in a wireless network is disclosed. The user equipment has wireless circuitry including a receiver, a transmitter, and a memory circuit storing data and commands. The user equipment may also include a processor circuit configured to execute commands stored in the memory circuit. Thus, when executing commands stored in the memory circuit, the processor circuit causes the receiver to receive an information message from a network serving node, the information message comprising a list of a plurality of measurement nodes in the wireless network. The processor circuit also performs a measurements on signals received from one or more network nodes in the plurality of measurement nodes. The processor circuit is also configured to select transmission nodes from the plurality of measurement nodes. In some embodiments, the processor circuit selects a plurality of filter lengths for each transmission node in the plurality of transmission nodes. Accordingly, the user equipment may provide the selected transmission nodes to the network serving node, as a feedback.

FIG. 1A illustrates a partial view of a network 100 for a downlink transmission scheme according to some embodiments. Network 100 can generally be a wireless telecommunications network, such as a cellular telephone network. Network 100 can implement a downlink (DL), Coordinated Multipoint (CoMP) transmission scheme to provide more robust and efficient communication as disclosed herein. Network 100 may include a plurality of nodes 105-1 through 105-6, a serving node 106, and a plurality of UEs, one of which is shown in FIG. 1A as UE 101. UE 101 may be any wireless communication device such as a smartphone, a tablet device, or a cellular phone. Each of the UEs 101 can be associated with a velocity vector 102 having non-zero speed and a particular direction. Each of nodes 105-1 through 105-6 (collectively referred to hereinafter as nodes 105) and serving node 106 can include one or more radio transmitters, one or more radio receivers, and a controller. The controller in network nodes 105 and 106 can include network wireless circuitry 111. Network wireless circuitry 111 can include processor circuitry and memory circuitry. The processor circuitry may be configured to execute commands and process data stored in the memory circuitry, causing network 100 to perform operations consistent with the present disclosure. In some embodiments, nodes 105 and serving node 106 can include an evolved Node-B (eNB) in embodiments where network 100 operates in accordance with a 3GPP compatible with Long-Term-Evolution (LTE) wireless communication protocol. Accordingly, nodes 105 and serving node 106 can form a geographically fixed geometry, while UEs 101 may be user devices (e.g., mobile phones) moving through network 100. UE 101 can also include a controller having UE wireless circuitry 103 including a processor circuit and a memory circuit. Accordingly, the processor circuit in UE wireless circuitry 103 can be configured to execute commands and process data stored in the memory circuit, causing UE 101 to perform operations consistent with the present disclosure.

In some embodiments, network wireless circuitry 111 and UE wireless circuitry 103 can include components such as: processors and/or specific-purpose digital signal processing (DSP) circuitry for implementing functionality such as, but not limited to, baseband signal processing, physical layer processing, data link layer processing, and/or other functionality. Network wireless circuitry 111 and UE wireless circuitry 103 can also include one or more digital to analog converters (DACs) for converting digital data to analog signals; one or more analog to digital converters (ADCs) for converting analog signals to digital data and radio frequency (RF) circuitry. Some examples of RF circuitry included in network wireless circuitry 111 and UE wireless circuitry 103 can be one or more amplifiers, mixers, filters, phase lock loops (PLLs), and/or oscillators; and/or other components.

Serving node 106 can be a master node coordinating downlink data transmission between network 100 and UE 101. Serving node 106 provides access grants for UE 101 to network 100. In some embodiments, serving node 106 also communicates (or coordinates) with a plurality of nodes 105 forming a CoMP coordinating set, for each UE 101. For example, nodes 105 can form a CoMP coordinating set mastered by serving node 106 for UE 101. In that regard, serving node 106 can also be referred to as an 'anchor point' for network 100 in relation to UE 101. Network 100 includes links 107 between each of the nodes 105 and between the nodes 105 and the serving node 106 to exchange channel feedback and/or user payloads between nodes in the network. For example, links 107 can be X2 links used to communicate downlink transmission or scheduling decisions in access network 100.

Figure 1B:
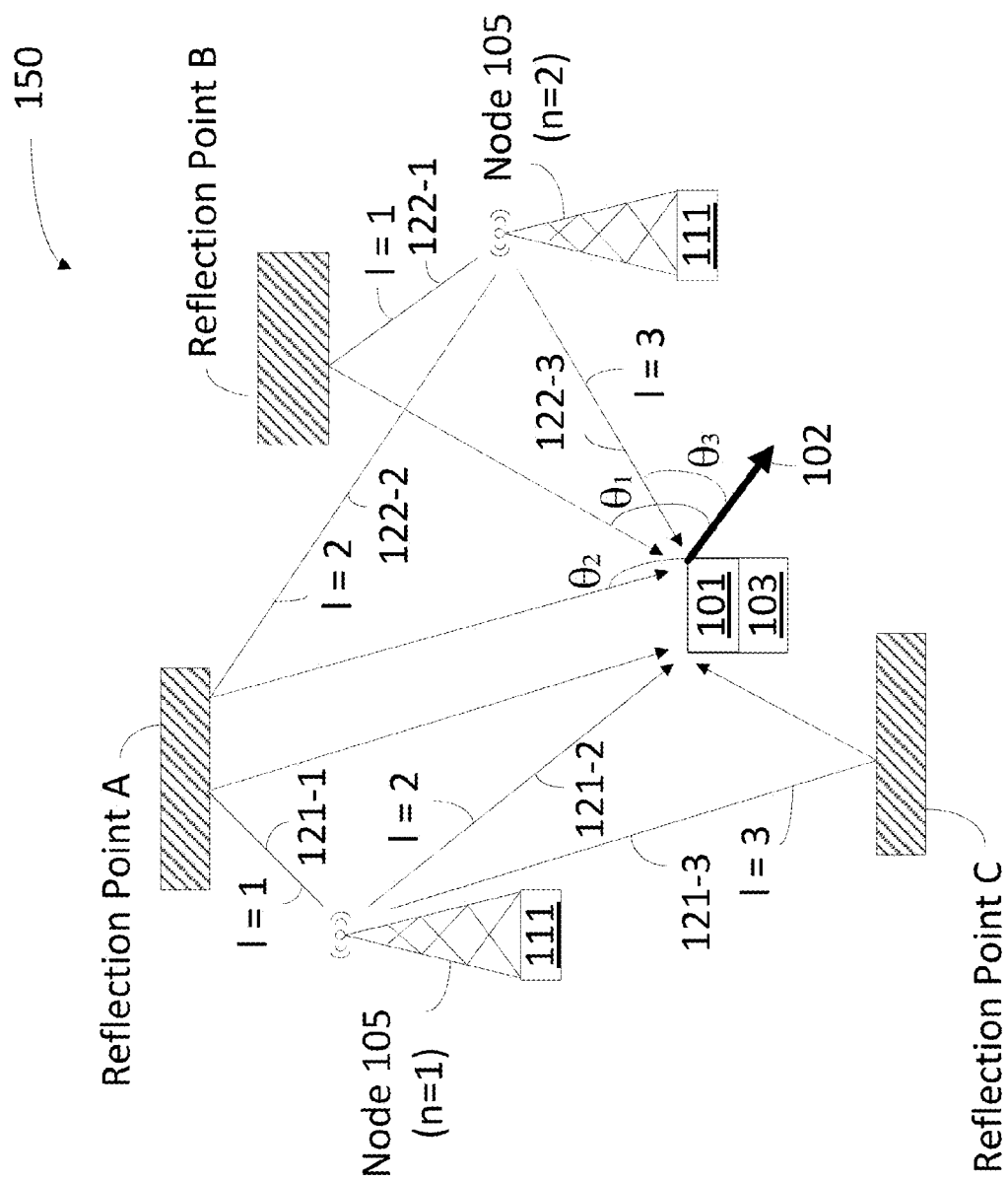
FIG. 1B illustrates a partial view of a multipath downlink transmission scheme according to some embodiments.

FIG. 1B illustrates a partial view of a multipath downlink transmission scheme 150 according to some embodiments. Multipath downlink transmission scheme 150 includes a first node 105-1, denoted with a node index n=1, and a second node 105-2, denoted with a node index n=2. Nodes 105-1 and 105-2 provide downlink transmission to UE 101, which is moving with velocity v, 102. Accordingly, signals transmitted from node 105-1 can reach UE 101 through multipath 121-1, multipath 121-2, and multipath 121-3 (hereinafter collectively referred to as multipaths 121). Multipath 121-1 may be assigned a multipath index 'l=1', and is formed by the reflection of a signal originating from node 105-1 and reflecting at reflection point A prior to reaching UE 101. Multipath 121-2 may be assigned a multipath index 'l=2', and is formed by direct travel of a signal from node 105-1 to UE 101. Multipath 121-3 may be assigned a multipath index 'l=3', and is formed by the reflection of a signal originating from node 105-1 and reflecting at reflection point C, prior to reaching UE 101. Likewise, signals transmitted from node 105-2 can reach UE 101 through multipath 122-1, multipath 122-2, and multipath 122-3 (hereinafter collectively referred to as multipaths 122). Multipath 122-1 may be assigned a multipath index 'l=1', and is formed by the reflection of a signal from node 105-2 via reflection point B, prior to reaching UE 101. Multipath 122-2 may be assigned a multipath index 'l=3', and is formed by the reflection of a signal from node 105-2 via reflection point A prior to reaching UE 101. Multipath 122-3 may be assigned a multipath index 'l=3', and is formed by direct travel of a signal from node 105-2 to reach UE 101. Reflection points A, B, and C may be any object that reflects an RF signal transmitted from a network node, such as a building, a geographic feature (i.e. a mountain or hill), or a moving element (a cloud or a patch of rain).

FIG. 1B also illustrates incidence angles $\theta_1$, $\theta_2$, $\theta_3$ for signals arriving at UE 101 from node 105-2. Accordingly, incidence angle $\theta_1$ is the angle of incidence of a signal coming from node 105-2, via multipath 122-1, relative to UE velocity 102. Likewise, incidence angle $\theta_2$ is the angle of incidence of a signal coming from node 105-2, via multipath 122-2, relative to UE velocity 102. And incidence angle $\theta_3$ is the angle of incidence of a signal coming from node 105-2, via multipath 122-3, relative to UE velocity 102. In some embodiments, each multipath 'l' may have a different incidence angle $\theta_1$ relative to UE velocity 102; and a different time delay, $\tau_l$, for signals originating from the same network node, 'n'. FIG. 1B illustrates three multipaths linking each one of nodes 105-1 and 105-2 with UE 101. The number of multipaths in a downlink transmission from a node 105 'n' to UE 101 at any given time is not limiting. One of ordinary skill will recognize that a node 105 'n' may include any number of multipaths in a downlink to UE 101. Furthermore, the number of multipaths in a downlink transmission from a node 105 'n' to UE 101 may change over time.

Performance of a downlink CoMP system may depend on a transmission set clustering accuracy. Although multiple nodes contribute to the scheduling decisions and user plane data transfer, clustering decisions are anchored by the Radio Resource Control (RRC) and Media Access Control (MAC) layer of serving node 106. Due to CoMP system delays that can be caused by Channel Status Information (CSI) transfers, serving node 106 processing delays, and network topology constraints, multi-point CSI feedbacks received at serving node 106 can be outdated at the time of a joint Physical Downlink Shared Channel (PDSCH) transmission. This delay can degrade system performance in terms of access network energy efficiency and in terms of downlink data rates observed at UE 101. The rate of change of the complex baseband Channel Impulse Response (CIR), hereinafter denoted by the letter 'h', is limited by the time varying CIR autocorrelation (hereinafter denoted by the letter '$R_h$'), and can be derived by the Markov inequality of Eq. 1.

$$\text{Prob}(|h(t_i,\tau_0)-h(t_j,\tau_0)|>\epsilon|)\leq 2(R_h(|\Delta t=0,\Delta\tau=0|)-R_h(|t_i-t_j,\Delta\tau=0|))/\epsilon^2 \quad (1)$$

where $R_h$ is the autocorrelation value for the channel impulse response 'h'. The value of $R_h(\Delta t, \Delta\tau)$ decreases for higher delays ($\Delta t \neq 0$), increasing the value of the right hand side in Eq. 1. Thus, higher delays reduce accuracy for Channel Status Information (CSI) feedback and clustering decisions. In some embodiments, CIR 'h' can be a complex function h(n,i,t) defined as in Eq. 2.

$$h(n,i,t,\tau_l)=A_l(t)e^{j2\pi f_{dl}(t)} \cdot e^{j2\pi f_c \cdot \tau_l} e^{j2\pi \cdot \phi_l} \delta(\tau-\tau_l), \quad (2)$$

where 'l' indicates a specific multipath linking node 'n' with UE 101 ('i', cf. FIG. 1B). In Eq. 2, $f_c$ is the carrier frequency, $A_l$, $f_{d_l}$ and $\phi_l$ represent the time varying amplitude, Doppler frequency and additional phase shifts, respectively, observed at the specific multipath component 'l' (also referred-to as 'delay tap' l, cf. FIG. 1B). Amplitude $A_l$ and Doppler shift $f_{dl}$ of each multipath component is represented as a function of time. Indeed, the received power $A_l$ of each multipath is subject to change due to UE mobility. The Doppler shift $f_{dl}$ is a function of time and depends on the multipath component since the spatial angle, $\theta_l$, between the direction of UE velocity 102 and the received wave at UE 101 'i' depends on the multipath and changes in time (cf. FIG. 1B). Likewise, $\tau_l$ is a multipath delay time.

UE 101 can experience fluctuations in received power due to a small scale fading effect of a time varying multipath channel. The received power fluctuation between node 'n' and UE 101 'i' at time 't,' due to small scale fading can be modeled through a fading function $P_{fading}$(n, i, t) in Eq. 3.

$$P_{fading}(n, i, t) = 10 \cdot \log_{10}\left[\frac{\left(\left|\sum_{l=1}^{L} h_{n,i}(t, \tau)\right|\right)^2}{2}\right] \quad (3)$$

Accordingly, the received signal power at UE 'i' from node 'n' at time 't' is formulated as $$P_{RX}(n,i,t)=P_{TX}(n)-P_L(n,i)-P_{fading}(n,i,t) \quad (4)$$

where $P_L$(n,i) is the large scale path loss between UE 101 'i' and node 'n'.

Figure 2:
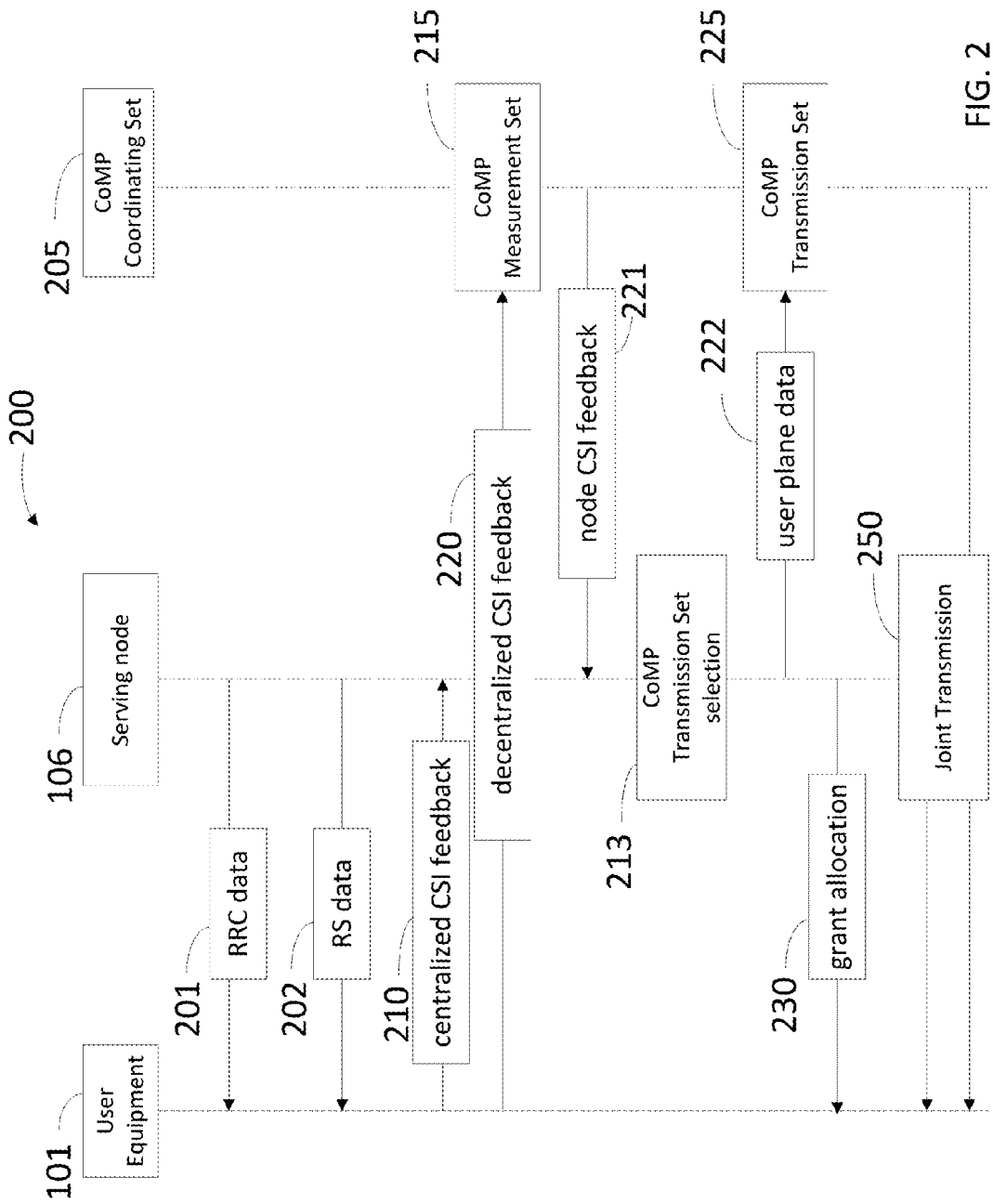
FIG. 2 illustrates a diagram showing interactions between components in a downlink transmission scheme, according to some embodiments.

FIG. 2 illustrates a schematic diagram showing interactions between components in a downlink transmission scheme 200 according to some embodiments.

Downlink transmission scheme 200 can be a DL-CoMP transmission scheme. CoMP coordinating set 205 is a set of network nodes having logical/physical links (e.g., links 107, cf. FIG. 1A). CoMP coordinating set 205 can include nodes 105. Serving node 106 can operate as a master of CoMP coordinating set 205 (cf. FIG. 1A). Serving node 106 transmits Radio Resource Control (RRC) data 201 to UE 101 via downlink signaling. RRC data 201 may be a first information message including a CoMP measurement set 215. CoMP measurement set 215 can be a plurality of nodes 105 selected from CoMP coordinating set 205. RRC data 201 can also include measurement identifiers (IDs) for each node. A measurement ID can identify a measurement as a Reference Signal Received Power (RSRP) or a Reference Signal Received Quality (RSRQ) for each of nodes 105 in CoMP measurement set 215. In that regard, RSRP and RSRQ data are related to reference symbols provided by network 100 within specifically allocated time and frequency slots. Serving node 106 can select nodes 105 to provide data 201 to UE 101 based on the location of UE 101 and on the feasibility of coordination of the selected nodes 105 by serving node 106.

Serving node 106 also provides Reference Symbol (RS) transmission data 202 to UE 101. RS transmission data 202 may be a second information message including Channel Status Information (CSI) RSs inserted in the resource blocks. RS transmission data 202 enables the UE to perform multi-point and single point channel estimation. Accordingly, RS transmission data 202 can include UE specific reference symbols and cell specific reference symbols. A cell can include a set of nodes 105 coordinated by serving node 106, as illustrated in FIG. 1A. After performing multi-point channel estimation using CSI-RSs, UE 101 can provide centralized CSI feedback 210. Centralized CSI feedback 210 can include multi-point feedback, in which UE 101 passes CSI for all the points in CoMP measurement set 215 to serving node 106. Centralized CSI feedback 210 can include explicit feedback and implicit feedback. Accordingly, explicit feedback can include a complex CIR observed by UE 101, including a noise component. Implicit feedback can include Channel Quality Information (CQI) such as a CSI value that can be used by serving node 106 to map a certain downlink modulation scheme.

In some embodiments, UE 101 can also provide decentralized CSI feedback 220 to each of nodes 105 in CoMP measurement set 215. In decentralized multi-point feedback, UE 101 passes measured/observed CSI to each node 105 listed in CoMP measurement set 215, separately. Nodes 105 in CoMP measurement set 215 can then relay received node CSI feedback 221 to serving node 106, over link 107. Node CSI feedback 221 can include decentralized CSI feedback 220 received in node 105 from UE 101. In some embodiments, serving node 106 selects a subset of CoMP measurement set 215 to form a CoMP transmission set 225, based on centralized CSI feedback 210 and on decentralized CSI feedback 220. In that regard, UE 101 provides centralized CSI feedback 210 and decentralized CSI feedback 220 for selected nodes 105 in CoMP measurement set 215. Accordingly, UE 101 may select nodes 105 in CoMP measurement set 215 according to a likelihood that the selected nodes may be included in a forthcoming CoMP transmission set 225. A forthcoming CoMP transmission set 225 may be the next CoMP transmission set provided by serving node 106 for the downlink transmission channel with UE 101 (cf. box 213).

By providing centralized CSI feedback 210 and decentralized CSI feedback 220 on selected nodes, downlink transmission scheme 200 allows faster data transmission rates and lower power usage from the network. Indeed, collecting information on selected nodes reduces the amount of data processing for serving node 106, and reduces the amount of downlink transmission overhead to UE 101. In some embodiments, UE 101 provides a more selective decentralized CSI feedback 220 to nodes in CoMP measurement set 215 than the centralized CSI feedback 210 to serving node 106. In that regard, the nodes selected by UE 101 in decentralized CSI feedback 220 may be a subset of the nodes selected by UE 101 in centralized feedback 210.

In some embodiments, serving node 106 transmits user plane data 222 destined to UE 101 received from the network (e.g., from a packet data network gateway) to each of nodes 105 included in CoMP transmission set 225. In some embodiments, selection of CoMP transmission set 225 is determined or provided by an RRC/MAC layer of serving node 106 after consolidating multi-point feedback provided by UE 101 for each member of CoMP measurement set 215. Selection of CoMP transmission set 225 can also include performing a thresholding decision on approximated downlink received powers of each radio link between UE 101 and each node 105 in CoMP coordinating set 205. Serving node 106 transmits a DL-CoMP grant allocation 230 to UE 101 over Enhanced-Physical Downlink Control Channel (E-PDCCH). The DL-CoMP grant allocation 230 can include information such as: system frame/sub-frames chosen for CoMP transmission, number of resource blocks assigned to UE 101 and the members of CoMP transmission set 225. In some embodiments, user plane data is transmitted to UE 101, over a Physical Downlink Shared Channel (PDSCH) jointly by the members of CoMP transmission set 225 over the specified resource blocks. The joint transmission 250 can include data transferred to UE 101 by serving node 106 and by network nodes 105 in CoMP transmission set 225. In some embodiments, a transmission mode TM9 for a supporting 3GPP protocol is used to transfer user plane data to UE 101.

In embodiments having minimal system delays and minimal channel estimation errors, a CoMP transmission set 225 can be selected using a thresholding technique based on received signal powers, e.g., $P_{RX}(n,t,i)$ (cf. Eq. 4). Values of $P_{RX}(n,t,i)$ are consolidated at the serving node 106 using multi-point CSI feedback provided by UE 101 (centralized and de-centralized). Serving node 106 uses a joint transmission threshold ($\nabla_{NW\_JT}$) to select nodes 105 ('n') having $P_{RX}(n,t,i)$ values within $\nabla_{NW\_JT}$ (in dB) compared to the node with the highest $P_{RX}(n,t,i)$. Accordingly, nodes 'n' satisfying the joint transmission threshold condition are included in the CoMP transmission set 225. Remaining members of CoMP measurement set 215 are excluded from joint PDSCH scheduling. Due to the lack of CSI-RS for the multi-point channel estimation and also due to noise in the channel, the consolidated DL received power values of CoMP measurement set 215 can be inaccurate. In some embodiments, this error is modeled as a Gaussian random variable, $P_{err}(\mu,\sigma)$, with mean and standard deviation $\sigma$, in dB. Several factors can contribute to a joint transmission clustering decision, such as: network topology constraints and multi-point feedback radio propagation. Other contributing factors may include delays of CSI feedback transfer from nodes in CoMP measurement set 215 to the serving node over X2, serving node processing and decision delays, and delays of the user plane data transfer from serving node 106 to the chosen members (nodes 105) of CoMP transmission set 225. A clustering decision by the serving node 106 at time 't' can be made according to potentially corrupted and outdated DL received power values. Inaccuracy in the received power value ($P_{RX\_err}$) for a channel linking node 105 'n' with UE 101 'i' at time 't', due to channel estimation errors and system delays, can be modeled as:

$$P_{RX_{err}}(n,t,i) = P_{RX}(n,t-\Delta,i) + P_{err}(\mu,\sigma) \qquad (5)$$

In Eq. 5, $\Delta$ is a CoMP system delay, typically given in ms. Accordingly, $\Delta$ includes the time it takes for serving node 106 to collect CSI feedback signal from UEs 101. Delay $\Delta$ can include multiple effects such as channel feedback radio propagation time, consolidation of multi-point CSI feedback at serving node 106, and multi-point CSI processing to determine the CoMP transmission set 225. Thus, in some embodiments, it can be desirable to transfer at least some of the decision making regarding CoMP transmission set 225 from serving node 106 to UE 101. This can have the effect of redistributing computational tasks and relieving resources at serving node 106 so that these resources can be applied more efficiently to a large number of UEs 101.

Once CoMP transmission set 225 is selected, a received power value at UE 101 can be associated with the CoMP transmission set 225. The received power value associated with CoMP transmission set 225 can be used to estimate network performance characteristics. In some embodiments, a total received signal power, $P_{JT}(i,t)$, received at UE 101 'i' from all nodes 105 included in CoMP transmission set 225, denoted as JT(i,t), can be obtained as $$P_{JT}(i,t) = \sum_{n \in JT(i,t)} P_{RX}(n,t,i) \qquad (6)$$

Figure 3:
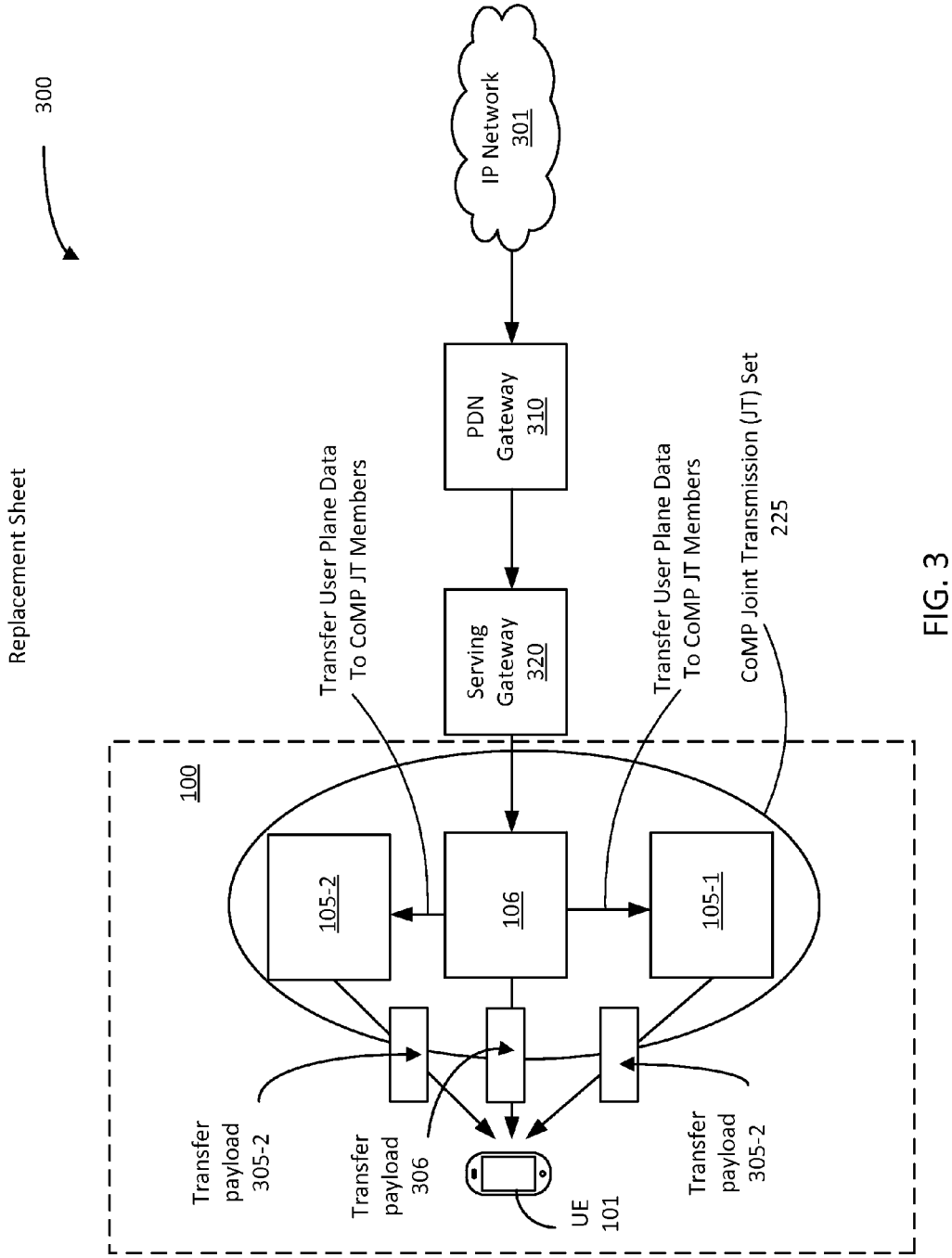
FIG. 3 illustrates a user plane data flow for a downlink transmission scheme, according to some embodiments.

FIG. 3 illustrates a user plane data flow for a downlink transmission scheme 300 according to some embodiments. Downlink transmission scheme 300 can include a CoMP transmission scheme as disclosed herein (cf. FIGS. 1 and 2). Accordingly, downlink transmission scheme 300 can include an Internet Protocol (IP) network 301, a Packet Data Network (PDN) Gateway (GW) 310, a serving gateway 320, CoMP transmission set 225, and UE 101. Accordingly, CoMP transmission set 225 can include serving node 106 and nodes 105-1 and 105-2. At least a portion of a downlink user plane payload coming from PDN-GW 310 and targeted for UE 101 can be transferred by serving node 106 to members of CoMP transmission set 225, (i.e., nodes 105-1 and 105-2), over links 107. User plane data can include user payload 305-1, user payload 305-2, and user payload 306. In some embodiments, user payload can be transmitted directly from members of CoMP transmission set 225 to UE 101. For example, node 105-2 can transfer payload 305-2, node 105-1 can transfer payload 305-1, and serving node 106 can transfer payload 306. In that regard, user payload 305-1, user payload 305-2, and user payload 306 may form a multi-point user plane data from the plurality of network nodes 105 included in CoMP transmission set 225. Nodes in CoMP transmission set 225 can transmit data to the UE 101, receive data from UE 101, provide scheduling decisions to the UE, and can reduce interference in the network 100 (cf. joint transmission 250, FIG. 2). Serving node 106 can select which network nodes to use for the CoMP transmission set to communicate with UE 101.

Figure 4:
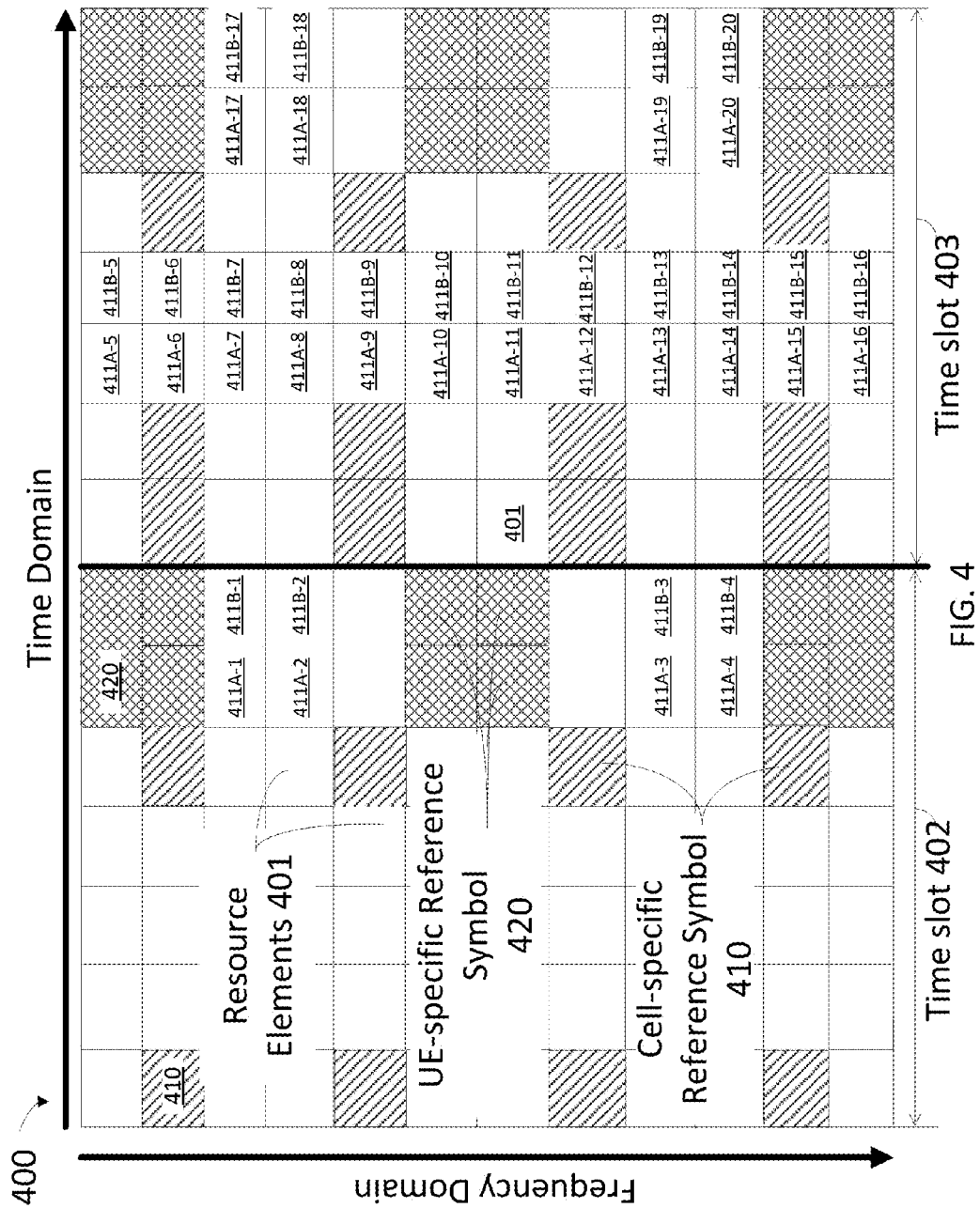
FIG. 4 illustrates a data sub-frame for a downlink transmission scheme, according to some embodiments.

FIG. 4 illustrates a data sub-frame 400 for a downlink transmission scheme according to some embodiments. Sub-frame 400 includes time slots 402 and 403, each time slot 402/403 including a plurality of resource elements 401, some of which include reference symbols (RSs) 410 and 420, according to some embodiments. A reference symbol scheme as disclosed herein can include a Long-Term-Evolution (LTE), and LTE-Advanced (LTE-A) schemes for channel estimation and data demodulation. Resource elements 401 are distributed across a Transmission Time Interval (TTI) along a time-domain axis (horizontal axis in FIG. 4), and are allocated to specific frequency modulation bands, or 'subcarrier frequency' along a frequency domain axis (vertical axis in FIG. 4). In some embodiments, a TTI for sub-frame 400 can extend for 1 millisecond (ms). Sub-frame 400 can be divided into two time slots, 402 and 403. In some embodiments, time slots 402 and 403 have the same time duration (e.g., 0.5 ms) and include the same number of resource elements 401. In an embodiment, the number of symbols depends on a Cycling Prefix (CP) in use for a given configuration protocol being used. In an embodiment compatible with LTE/LTE-A transmission schemes, a resource block pair spans twelve (12) orthogonal subcarriers with normal CP use; that is, 7 Orthogonal Frequency Division Multiplexing (OFDM) symbols per 0.5 ms slot, or 14 OFDM symbols per sub-carrier.

Sub-frame 400 can include cell specific reference symbols 410 and UE specific reference symbols 420, to use for channel estimation and data demodulation. UE specific reference symbols 420 can be used in a PDSCH demodulation protocol. Cell specific reference symbols 410 can be used in single point channel estimation (e.g., RS transmission data 202, cf. FIG. 2). Such configuration can be applied in pre LTE-A networks, for serving node 106. Both for normal CP use (7 OFDM symbols per timeslot channel) and for extended CP use (6 OFDM symbols per timeslot channel), in single or two-antenna port supporting nodes 105, there can be at least eight (8) reference symbols 410 available per sub-frame 400. Cell specific reference symbols 410 enable UE 101 to perform single point channel estimation. In that regard, single-point channel estimation is less vulnerable to estimation errors due to the larger number of reference symbols included from a single point. UE 101 can perform time domain interpolation and frequency domain interpolation using cell specific reference symbols 410 to estimate and predict channel sample behavior for resource elements 401 not containing cell specific reference symbols 410.

FIG. 4 also illustrates resource elements 411A-1 through 411A-20 and 411B-1 through 411B-20, collectively referred hereinafter as 'resource elements 411A' and 'resource elements 411B,' respectively. Resource elements 411A and 411B can be used for multi-point channel estimation, according to embodiments consistent with the present disclosure. For example, each of resource elements 411A-i can correspond to a reference symbol from port A in a node 'i' of network 100. Likewise, each of resource elements 411B-j can correspond to a reference symbol from port B in a node 'j' of network 100. In embodiments consistent with a DL-CoMP transmission scheme as disclosed herein, nodes 'i' and 'j' can belong to CoMP measurement set 215 (cf. FIG. 2). In that regard, nodes 'i' and 'j' may be outside of a cell containing serving node 106 and UE 101. Accordingly, in FIG. 4 the values of 'i' and 'j' for nodes in the CoMP measurement set 215 can be any integer between 1 and 20. In some embodiments, the number of resource elements allocated in sub-frame 400 for multi-point channel estimation can be equal or greater than the number of nodes 105 in CoMP measurement set 215. In some embodiments, an LTE/LTE-A network 100 supporting CoMP downlink transmission can include 40 resource elements 411A and 411B allocated for multi-point channel estimation. Accordingly, the 40 resource elements can include 20 resource elements 411A for port A and 20 resource elements 411B for port B from 20 different nodes. Resource elements 411A and 411B may be used by UE 101 to perform coherent detection and equalization for each node 105 in CoMP measurement set 215. Thus, UE 101 may provide CSI feedback on each of the nodes 105 in CoMP transmission set 225 or in CoMP measurement set 215. Accordingly, UE 101 may provide centralized CSI feedback to serving node 106 or decentralized feedback to each of the nodes 105 in CoMP transmission set 225 (cf. FIG. 2). One of ordinary skill will realize that the total number of resource elements allocated for multipoint channel estimation is not limiting and can vary for different implementations. For example, in some embodiments network 100 can include nodes 105 having more than two transmit antenna ports (e.g., A, B, C, and more) and/or a different number of nodes 105 in CoMP measurement set 215. In some configurations, sub-frame 400 can allocate more than 40 resource elements for multipoint channel estimation to include reference symbols from each port.

Figures 5A, 5B:
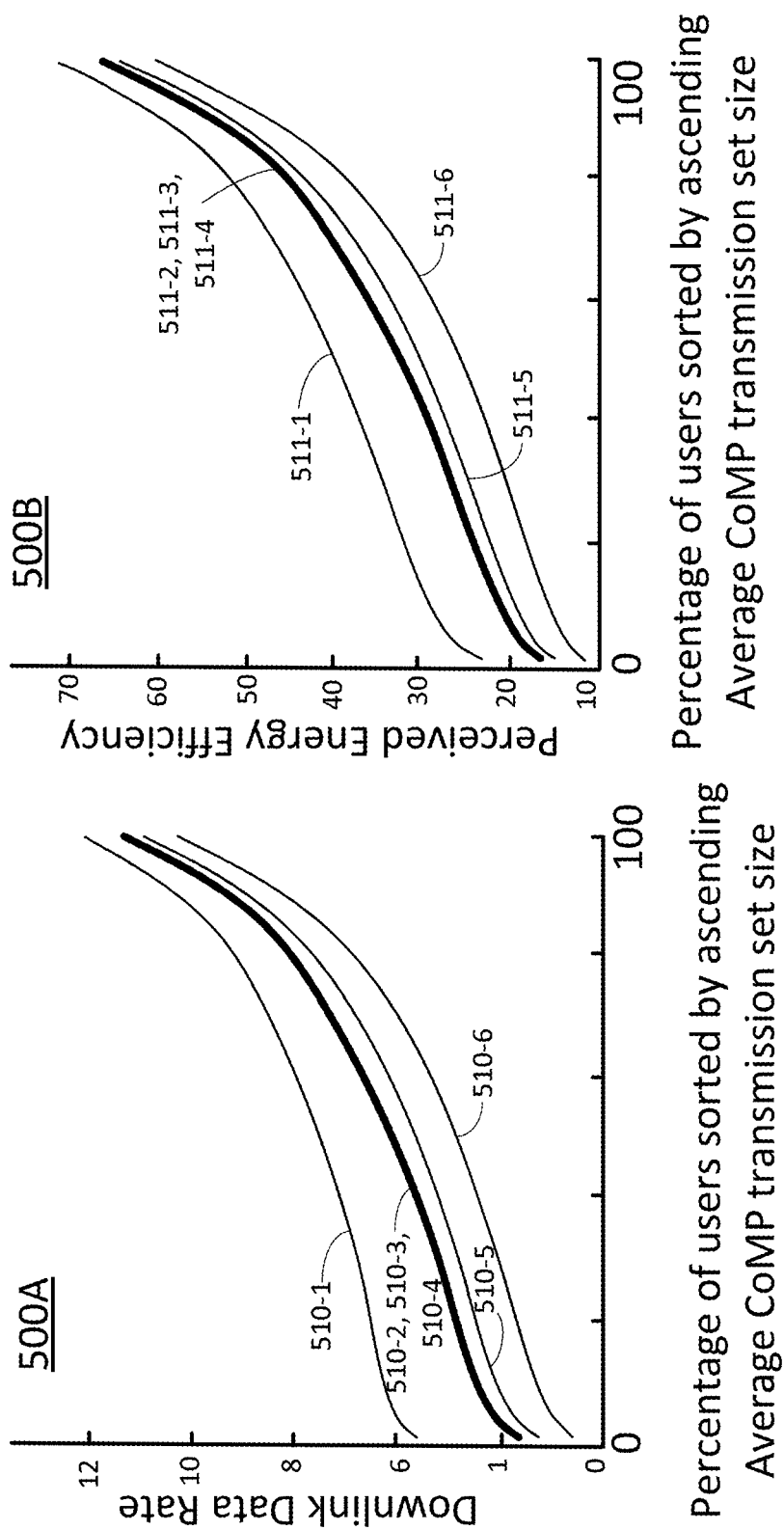
FIG. 5A illustrates a chart for received downlink data rates in a downlink transmission scheme under varying delay and estimation error configurations, according to some embodiments.
FIG. 5B illustrates a chart for perceived energy efficiency in a downlink transmission scheme under varying delay and estimation error configurations, according to some embodiments.

FIG. 5A illustrates a chart 500A for received downlink data rates in a downlink CoMP transmission scheme under varying delay and estimation error configurations, according to some embodiments. The configuration of network 100 in FIG. 5A corresponds to UEs 101 having relatively low mobility, with velocity 102 approximately 6 Km/hr (Kilometer per hour). FIG. 5A provides information on the impact of CoMP delay and estimation errors on downlink capacity under low mobility conditions. The abscissa (horizontal axis) in chart 500A indicates a percentage of users sorted by ascending average CoMP transmission set size. For example, low values of about 1% in the abscissa in chart 500A indicate a set of users (i.e., only 1% of the total universe of users logged in the network) at the top of a list of users. The list can be sorted from highest CoMP transmission set size to lowest CoMP transmission set size. Here, the size of the CoMP transmission set is the number of nodes in the network that belong to the specific CoMP transmission set 225 (cf. FIG. 2). The ordinate (vertical axis) in chart 500A indicates a downlink data rate which can be expressed in megabits per second units [Mbits/second]. Curves 510-1 through 510-6 (collectively referred hereinafter as curves 510) correspond to different delay and estimation error configurations consistent with embodiments disclosed herein. Curves 510 indicate that increased delay and higher estimation errors can result in lower downlink data rates.

Curve 510-1 indicates zero delay and zero estimation error. Curve 510-2 indicates 1 ms delay and 4 dB estimation error. Curve 510-3 indicates 3 ms delay and 1 dB estimation error. Curve 510-4 indicates 5 ms delay and 4 dB estimation error. Curve 510-5 indicates 10 ms delay and 1 dB estimation error. And curve 510-6 indicates 20 ms delay and 4 dB estimation error. Curves 510 show, in general, that the received downlink data rates are lower for downlinks including larger CoMP transmission sets. This results from longer processing times under configurations having larger CoMP sets.

FIG. 5B illustrates a chart 500B for perceived energy efficiency in a downlink CoMP transmission scheme under varying delay and estimation error configurations, according to some embodiments. The configuration of network 100 in FIG. 5B corresponds to UEs 101 having relatively low mobility, with velocity 102 approximately 6 Km/hr (Kilometer per hour). The abscissa in chart 500B indicates a percentage of users sorted by ascending CoMP transmission set size, as detailed above. The ordinate in chart 500B indicates a perceived energy efficiency, expressed in kilobits per Watt [kbits/W]. Curves 511-1 through 511-6 (collectively referred hereinafter as curves 511) correspond to different delay and estimation error configurations consistent with curves 510, as described above. Curves 511 show, in general, that the perceived energy efficiency is lower for downlinks including larger CoMP transmission sets. This results from higher computational complexity under configurations having larger CoMP sets. Curves 511 also indicate that increased delay and higher estimation errors can result in lower perceived energy efficiency.

Figures 5C, 5D:
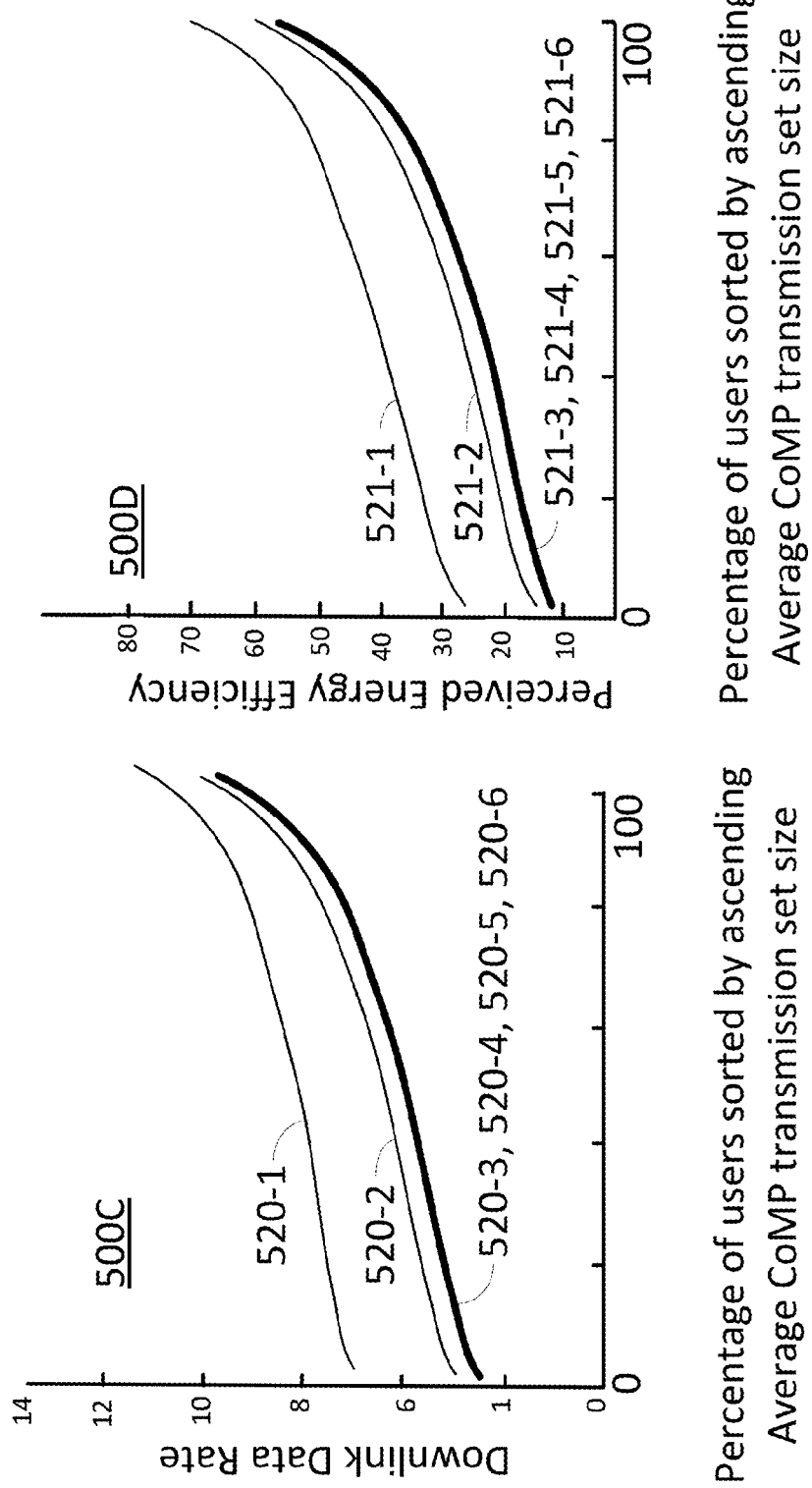
FIG. 5C illustrates a chart for received downlink data rates in a downlink transmission scheme under varying delay and estimation error configurations, according to some embodiments.
FIG. 5D illustrates a chart for perceived energy efficiency in a downlink transmission scheme under varying delay and estimation error configurations, according to some embodiments.

FIG. 5C illustrates a chart 500C for received downlink data rates in a downlink CoMP transmission scheme under varying delay and estimation error configurations, according to some embodiments. The configuration of network 100 in FIG. 5C corresponds to UEs 101 having relatively high mobility, with velocity 102 approximately 120 Km/hr (Kilometer per hour). The ordinate and the abscissa in chart 500C are the same as in chart 500A, described in detail above. FIG. 5C provides information on the impact of CoMP delay and estimation errors on downlink capacity under high mobility conditions. Curves 520-1 through 520-6 (collectively referred hereinafter as curves 520) correspond to different delay and estimation error configurations consistent with embodiments disclosed herein. Curves 520 indicate that increased delay and higher estimation errors can result in lower downlink data rates.

Curve 520-1 indicates zero delay and zero estimation error. Curve 520-2 indicates 1 ms delay and 4 dB estimation error. Curve 520-3 indicates 3 ms delay and 1 dB estimation error. Curve 520-4 indicates 5 ms delay and 4 dB estimation error. Curve 520-5 indicates 10 ms delay and 1 dB estimation error. And curve 520-6 indicates 20 ms delay and 4 dB estimation error. Curves 520 show in general, that the received downlink data rates are lower for downlinks including larger CoMP transmission sets. This results from longer processing times under configurations having larger CoMP sets.

FIG. 5D illustrates a chart 500D for perceived energy efficiency in a downlink CoMP transmission scheme under varying delay and estimation error configurations, according to some embodiments. The configuration of network 100 in FIG. 5D corresponds to UEs 101 having relatively high mobility, with velocity 102 approximately 120 Km/hr (Kilometer per hour). The ordinate and the abscissa in chart 500D is the same as in chart 500B, described in detail above. Curves 521-1 through 521-6 (collectively referred hereinafter as curves 521) correspond to different delay and estimation error configurations consistent with curves 520 as described above. Curves 521 show, in general, that the perceived energy efficiency is lower for downlinks including larger CoMP transmission sets. This results from higher computational complexity under configurations having larger CoMP sets. Curves 521 also indicate that increased delay and higher estimation errors can result in lower perceived energy efficiency.

In Eq. 7, a channel capacity C(i,t) can be defined for a given UE 101, indicated as 'i', at time 't'. C(i,t) is given in bits per second rates (bit/sec, or 'bs'). Accordingly, the UE 101 'i' can be linked to a CoMP transmission set (denoted JT) of nodes in the network (e.g., CoMP transmission set 225, cf. FIG. 2), resulting in a C(i,t) given as $$C(i, t) = BW(i, t) \cdot \log_2 \left( 1 + \frac{P_{JT}(i, t)}{P_{noise} + \sum_{n \notin JT} P_{Rx}(n, i, t)} \right) \quad (7)$$

In Eq. 7, $P_{Rx}$(n,i,t) represents the power received from node 'n' by UE 'i', at time 't' (cf. Eq. 5) and BW(i,t) represents the total bandwidth associated with the channel. BW(i,t) can be the bandwidth allocated to UE 'i' at a specific TTI for a joint PDSCH transmission. For example, BW(i,t) can be allocated to UE 101 'i' by serving node 106. $P_{JT}$(i,t) represents the total signal power received at UE 101 'i', at time 't', from all nodes included in the CoMP transmission set, (cf. Eq. 6).

The CoMP transmission set 225 denoted with a Joint Transmission (JT) label in the equations, can be time dependent, in general. Indeed, in some embodiments an adaptive method enables real time adjustment of CoMP transmission set 225 according to network performance and power consumption efficiency. From C(i,t), an energy efficiency EE(i,t) can be defined (in bits/Joule) dividing the channel capacity by the power consumed in CoMP transmission set 225:

$$EE(i, t) = \frac{C(i, t)}{P_T(i, t)} \quad (8)$$

The total access network power consumption for each UE 101 'i', $P_T$(i,t), may be found as $$P_T(i,t) = P_{Base}, \text{for } N_c = 1 \quad (8.1)$$

Where $P_{Base}$ is the access network power consumption for scenarios where CoMP is not used and only a single base station is serving and assigning resources to UE 101. Or, in the case of a CoMP transmission set 225 having more than one element ($N_{JT}$(i,t)≥2), $P_T$(i,t) can be found as $$P_T(i,t) = P_{CoMP} + (N_{JT(i,t)} - 1) \cdot (P_{CoMP} - P_{Base}), N_{JT(i,t)} \geq 2 \quad (8.2)$$

In Eq. (8.2), the scaling factor ($N_{JT}$(i,t)−1) is used to make a power consumption comparison between different embodiments of a CoMP transmission set scheme. For user locations where CoMP is used (i.e. $N_{JT}$(i,t)≥2), the factor ($N_{JT(i,t)}$−1) ($P_{CoMP} - P_{Base}$) includes the additional power consumption of the transmission nodes participating in CoMP transmission set 225.

The power consumption of the access network, $P_{CoMP}$, can be expressed as shown in Eq. 9 (in Watts):

$$P_{CoMP} = N_S \cdot N_{P_{A\_sector}} \cdot \left(\frac{P_{TX}}{P_{Aeff}} + P_{SP}\right) \cdot (1 + C_C) \cdot (1 + C_{BB}) + P_{BH} \quad (9)$$

where Ns can represent the number of sectors. $N_{PA\_sector}$ is a ratio of the number of power amplifiers to the number of sectors. $P_{TX}$ is the downlink transmitted power. $P_{Aeff}$ is the power amplifier efficiency. $P_{SP}$, is the signal processing power; $C_C$, is the cooling loss. $C_{BB}$, is the battery backup loss. And $P_{BH}$ is the backhauling power.

With a channel response function h(n,i,t) (cf. Eq. 2), a CIR correlation can be obtained. For example, in a stochastic channel estimation scheme, a CIR correlation function of the complex baseband channel impulse response, $R_h(t_1, t_2, \tau_l)$, can be defined as the autocorrelation in the time domain at a particular multipath delay tap '$\tau_l$' as in Eq. 10.

$$R_h(t_1,t_2,\tau_l)=E(h(t_1+t,\tau_l)\cdot h^*(t_2,\tau_l)) \quad (10)$$

As the difference between CIR at instants $t_1$ and $t_2$ increases beyond a coherence time, the value of the correlation Rh as given by Eq. 10, is reduced.

Eq. 11 provides a time autocorrelation function $R_h(n,i,t_1, t_2)$ integrated over a plurality of multipaths l linking node 105 'n' with UE 101 'i' (cf. FIG. 1B), according to some embodiments:

$$R_h(t_1,t_2)=R_h(\Delta t)=\int_{l=1}^{L} R_h(\Delta t,\tau_l)\cdot d\tau_l \quad (11)$$

The time autocorrelation function can be defined as a correlation parameter 'c.' Accordingly, the value of 'c' can be found as: $c=R_h(\Delta t)$.

In some embodiments, a coherence time $\Delta t_c$ for the channel between node 'n' and UE 'i' may be determined. The coherence time can be inversely proportional to the Doppler shift induced in the carrier frequency due to the UE velocity (e.g., UE velocity 102, cf. FIG. 1A). Accordingly, step 720 can include finding a coherence time satisfying the below inequality:

$$\Delta t_c \geq \frac{\cos^{-1}(c)}{2\pi f_{maxDoppler}} \quad (12)$$

Where $f_{maxDoppler}$ is the maximum Doppler shift produced by the UE speed 102. Indeed, for a given UE velocity, the Doppler shift introduced to electromagnetic radiation depends on the relative orientation ($\theta_l$) between the direction of propagation of the electromagnetic radiation and the velocity direction (cf. FIG. 1B). The coherence time quantifies the self-similarity of a channel impulse response samples in a time varying fashion. Signals received by UE 101 within the coherence time of a channel are highly likely to have similar amplitudes. Thus, the predicting ability of UE 101 for channel data within the coherence time of any given TTI is better than for longer periods of time.

Figures 6A, 6B:
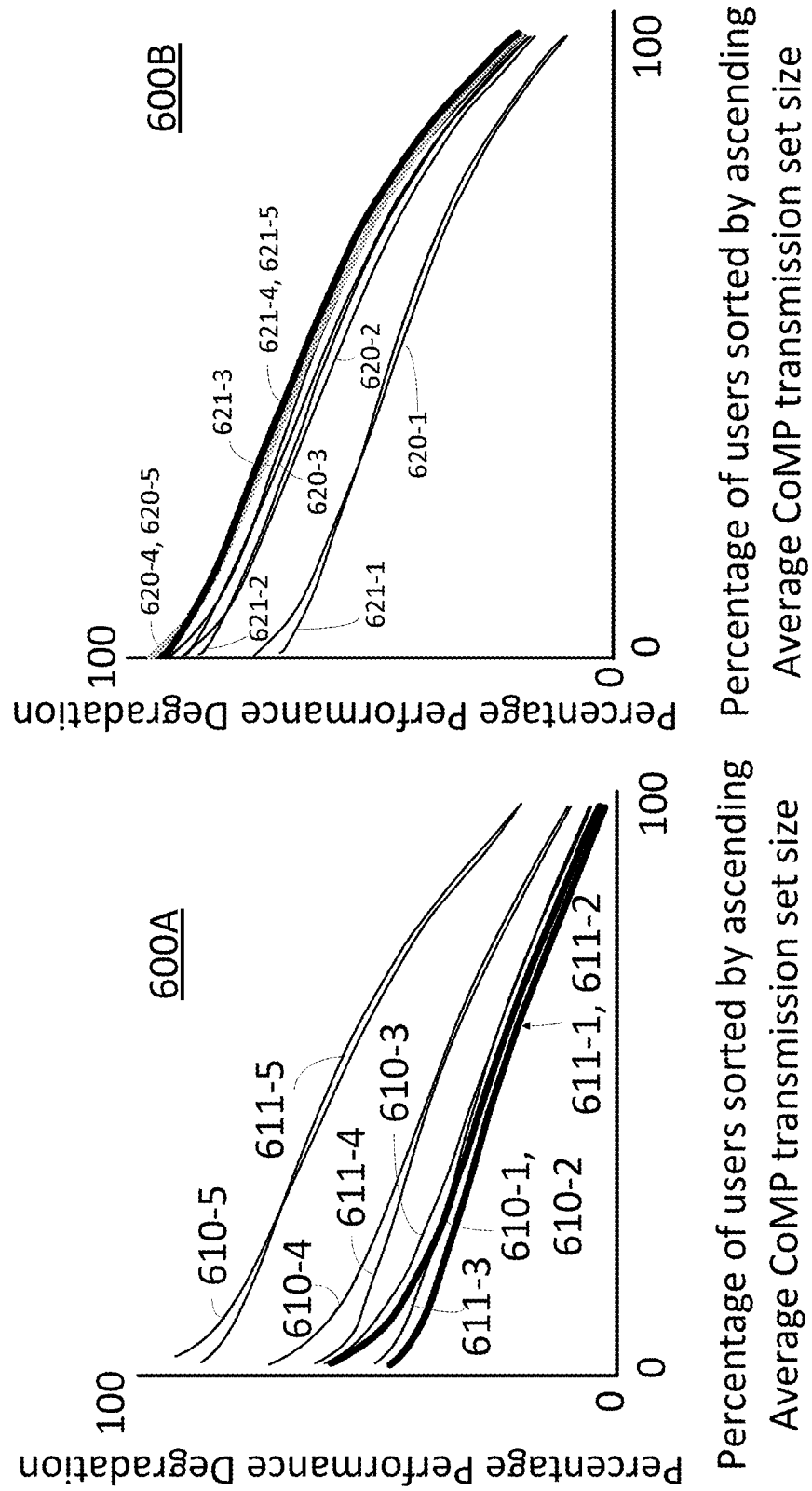
FIG. 6A illustrates a chart for percentage performance degradation in a downlink transmission scheme under varying delay and estimation error configurations, according to some embodiments.
FIG. 6B illustrates a chart for percentage performance degradation in a downlink transmission scheme under varying delay and estimation error configurations, according to some embodiments.

FIG. 6A illustrates a chart 600A for percentage performance degradation in a downlink transmission scheme under varying delay and estimation error configurations, according to some embodiments. The configuration of network 100 in FIG. 6A corresponds to UEs 101 having relatively low mobility, with velocity 102 approximately 6 Km/hr (Kilometer per hour). The abscissa in chart 600A indicates a percentage of users sorted by ascending CoMP transmission set size, as detailed above. The ordinate in chart 600A indicates a percentage performance degradation. Curves 610-1 through 610-5 (collectively referred hereinafter as downlink curves 610) correspond to downlink data rate degradation for different delay and estimation error configurations consistent with embodiments disclosed herein. Curve 610-1 represents 1 ms delay and 1 dB estimation error. Curve 610-2 represents 3 ms delay and 4 dB estimation error. Curve 610-3 represents 5 ms delay and 4 dB estimation error. Curve 610-4 represents 10 ms delay and 4 dB estimation error. Curve 610-5 represents 20 ms delay and 1 dB estimation error. Curves 611-1 through 611-5 (collectively referred hereinafter as energy efficiency curves 611) correspond to energy efficiency degradation for different delay and estimation error configurations consistent with curves 610 as described above. Curves 610 and 611 show generally a tendency for greater degradation in downlink performance for users having larger CoMP transmission sets, for a given delay and estimation error configuration.

FIG. 6B illustrates a chart 600B for percentage performance degradation in a downlink transmission scheme under varying delay and estimation error configurations, according to some embodiments. The configuration of network 100 in FIG. 6B corresponds to UEs 101 having relatively high mobility, with velocity 102 approximately 120 Km/hr (Kilometer per hour). The ordinate and abscissa in chart 600B are as described above in reference to FIG. 6A. Curves 620-1 through 620-5 (collectively referred hereinafter as downlink curves 620) correspond to downlink data rate degradation for different delay and estimation error configurations consistent with embodiments disclosed herein. Curve 620-1 represents 1 ms delay and 1 dB estimation error. Curve 620-2 represents 3 ms delay and 4 dB estimation error. Curve 620-3 represents 5 ms delay and 4 dB estimation error. Curve 620-4 represents 10 ms delay and 4 dB estimation error. Curve 620-5 represents 20 ms delay and 1 dB estimation error. Curves 621-1 through 621-5 (collectively referred hereinafter as energy efficiency curves 621) correspond to energy efficiency degradation for different delay and estimation error configurations consistent with curves 620 as described above. Curves 620 and 621 show generally a tendency for greater degradation in downlink performance for users having larger CoMP transmission sets, for a given delay and estimation error configuration.

UEs having larger CoMP transmission sets are affected more severely in terms of downlink capacities observed, and yield less energy efficient access networks. For instance, the top 1% of the users with highest CoMP set degrees in low mobility conditions suffered from 55% downlink capacity and 51% access network energy efficiency degradation when the system was subject to a power estimation error of 4 dB, and a delay time of up to 20 ms (cf. FIG. 6A). When all users (100%) are considered in the hexagonal cellular layout (both cell edge and cell center users), the observed energy efficiency and capacity degradation were only 16% and 17%, respectively (cf. right hand edge in FIG. 6A). Embodiments with higher UE speed 102 generally result in higher performance degradation (cf. FIG. 6B). Indeed, at higher UE speed 102 channel sample correlation degrades due to the Doppler effect reducing the accuracy of multi-point CSI feedback. Therefore, some embodiments consistent with the present disclosure introduce a multi-point channel estimation feedback wherein UE 101 can change the size of CoMP transmission set 225 (e.g., reducing the number of nodes 105). By applying a threshold step selection at the UE level, a number of nodes can be excluded from CoMP transmission set 225, thus increasing the efficiency of the entire network. This is illustrated in more detail in relation to FIG. 6C, below.

Figure 6C:
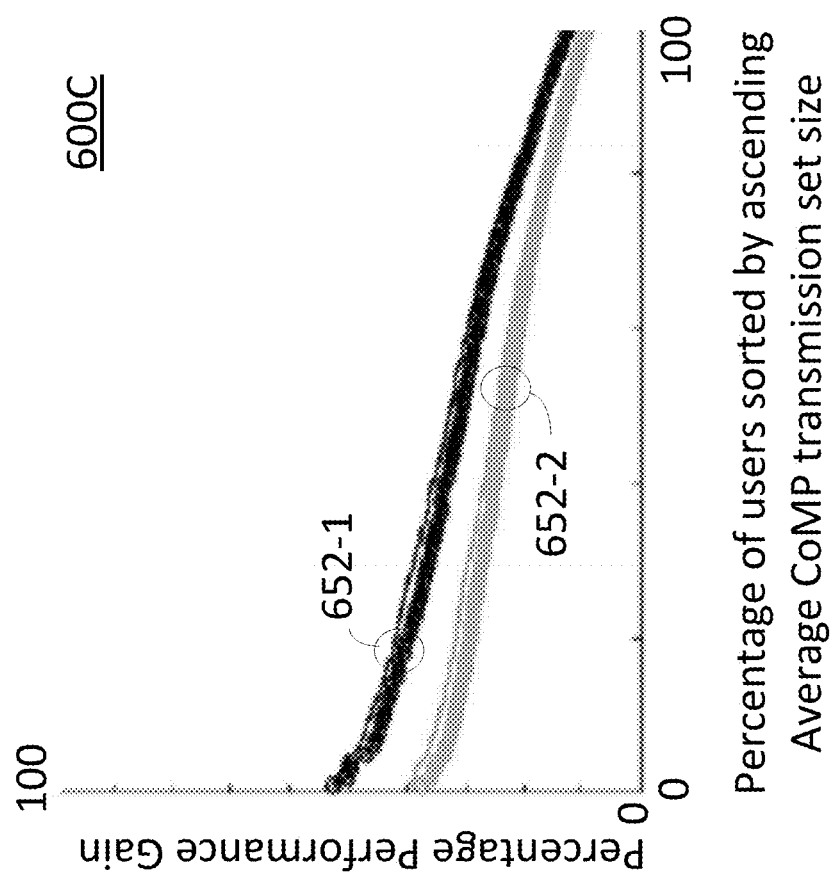
FIG. 6C illustrates a chart for percentage performance gain in a downlink transmission scheme under varying delay and estimation error configurations, according to some embodiments.

FIG. 6C illustrates a chart 600C for percentage performance gain in a downlink transmission scheme under varying delay and estimation error configurations, according to some embodiments. The abscissa in chart 600C indicates a percentage of users sorted by ascending CoMP transmission set size, as detailed above. The ordinate in chart 600C indicates a percentage performance gain when the network introduces multi-point channel estimation methods consistent with the present disclosure. Curves 652-1 and 652-2 (collectively referred to hereinafter as performance gain curves 652) illustrate percentage performance gain for CoMP transmission sets using filters having different lengths, consistent with embodiments disclosed herein. Accordingly, curve 652-1 corresponds to a multi-point channel estimation filter having a filter length of 30 TTIs. And curve 652-2 corresponds to a multi-point channel estimation filter having a filter length of 6 TTIs. In general, the filter length associated with a communication channel between UE 101 'i' and node 105 'n' may be a memory span, or memory buffer allocated by the memory circuit in UE 101 for buffering a signal from a node 'n' during a time equal to the filter length. Curves 652 show generally a tendency for greater gain in downlink performance upon multi-point channel estimation for users having larger CoMP transmission sets, for a given delay and estimation error configuration. Also, curves 652 show that a longer filter generally increases the performance gain of the downlink service when a multi-point channel estimation procedure is put in place.

FIG. 6C illustrates performance of CoMP transmission schemes for over 1000 TTIs for an hexagonal cellular layout of 19 nodes, and 2500 UEs 101 in each cell (cf. FIG. 1A). Networks consistent with the above results can include fixed length multi-point channel estimation filters of M=[0, 6, 30] for low mobility conditions to estimate complex baseband channel impulse response between each CoMP measurement set member for every multipath delay component. Using a fixed multi-point channel estimation filter with a memory span 6 TTIs causes 40% energy efficiency and capacity increases for the top 1% of UE's 101 having the highest CoMP transmission set size while yielding around 10% performance gains when 100% of UEs 101 are considered. Increasing filter length to 30 TTIs can increase performance gain to 53% for UEs in the highest 1% of CoMP transmission set size. Increasing filter length to 30 TTIs increases performance gains to 13% when all the UEs are taken into consideration.

According to some embodiments, the filter length is a function of the size of CoMP transmission set 225. A higher CoMP transmission set size can have accurate channel estimation and use larger filters. A CoMP measurement set 215 can include 10 members, but the CoMP transmission set 225 may include only 2 members of the CoMP measurement set 215, at any given time. Embodiments consistent with the present disclosure provide long filters only to the 2 members that belong to CoMP transmission set 225 at any given moment. This results in different filter length for each node 105 of CoMP measurement set 215 according to the observed recent history of the network nodes. Accordingly, the observed recent history of a network node can include a list of measurement values for a transmission channel including the network node, the measurement values collected for a selected period of time. The selected period of time may be a preselected time window adjusted by serving node 106 or by UE 101. Some embodiments can avoid using buffered memory, or storing any recent CoMP characteristics. In such configurations, the UE 101 can use instantaneous thresholding to select the CoMP transmission set locally with updated information received by the UE 101.

A filter length can be selected as an integer number 'M' of TTIs. In that regard, the filter length defines a time period during which UE 101 'i' 'listens' or receives a signal from node 'n'. Accordingly, in some embodiments a CIR, $h(t, \tau_l)$ function at time 't' can be estimated using 'M' prior values of the function using an autoregressive filter vector, '$w_m$', as $$\tilde{h}(t,\tau_l) = \tau_{m=0}^{M-1} w_m \cdot h(t-m, \tau_l) \quad (13)$$

where weighting coefficients $w_m$ can be stored in an array of length 'M'. Higher weight values $w_m$ in Eq. 13 can be associated with more recent samples (lower values of 'm') due to the decreasing nature of $R_h(\Delta t)$ which has a peak at $R_h(0)$ and decreases for $\Delta t > 0$. A detailed representation of a channel impulse response function is given below for an auto-regressive Minimum Mean Square Error (MMSE) channel estimation:

$$\tilde{h}_{t,\tau l} = [(R_h(\Delta t, \tau l) + \sigma_{noise}^2 \cdot I_{M \times M})^{-1} R_h(\Delta t, \tau l)]^H \cdot \hat{h}_{t, \ldots t-M+1; \tau l} \quad (14)$$

where the superscript 'H' denotes a Hermitian conjugate transpose of the matrix inside the parenthesis. The coefficients of the autoregressive filter vector $W_m$ can be derived as $$\begin{bmatrix} E[h(t, \tau l) \cdot h^*(t_n, \tau l)] + \sigma_{noise}^2 & \cdots & E[h(t, \tau l) \cdot h^*(t-M+1, \tau l)] \\ \vdots & \ddots & \vdots \\ E[h(t-M+1, \tau l) \cdot h^*(t_n, \tau l)] & \cdots & E[h(t-M+1, \tau l)] + \sigma_{noise}^2 \end{bmatrix}^{-1} \quad (15)$$

$$\begin{bmatrix} E[h(t, \tau l) \cdot h^*(t_n, \tau l)] \\ \vdots \\ E[h(t-M+1, \tau l) \cdot h^*(t_n, \tau l)] \end{bmatrix}$$

The Mx1 vector contacting CIR samples over 'M' intervals TTI is $$\hat{h}_{t, \ldots t-M+1; \tau l} = \begin{bmatrix} \hat{h}_{t_n, \tau l} \\ \vdots \\ \hat{h}_{t_{n-M+1}, \tau l} \end{bmatrix} \quad (16)$$

Figure 7:
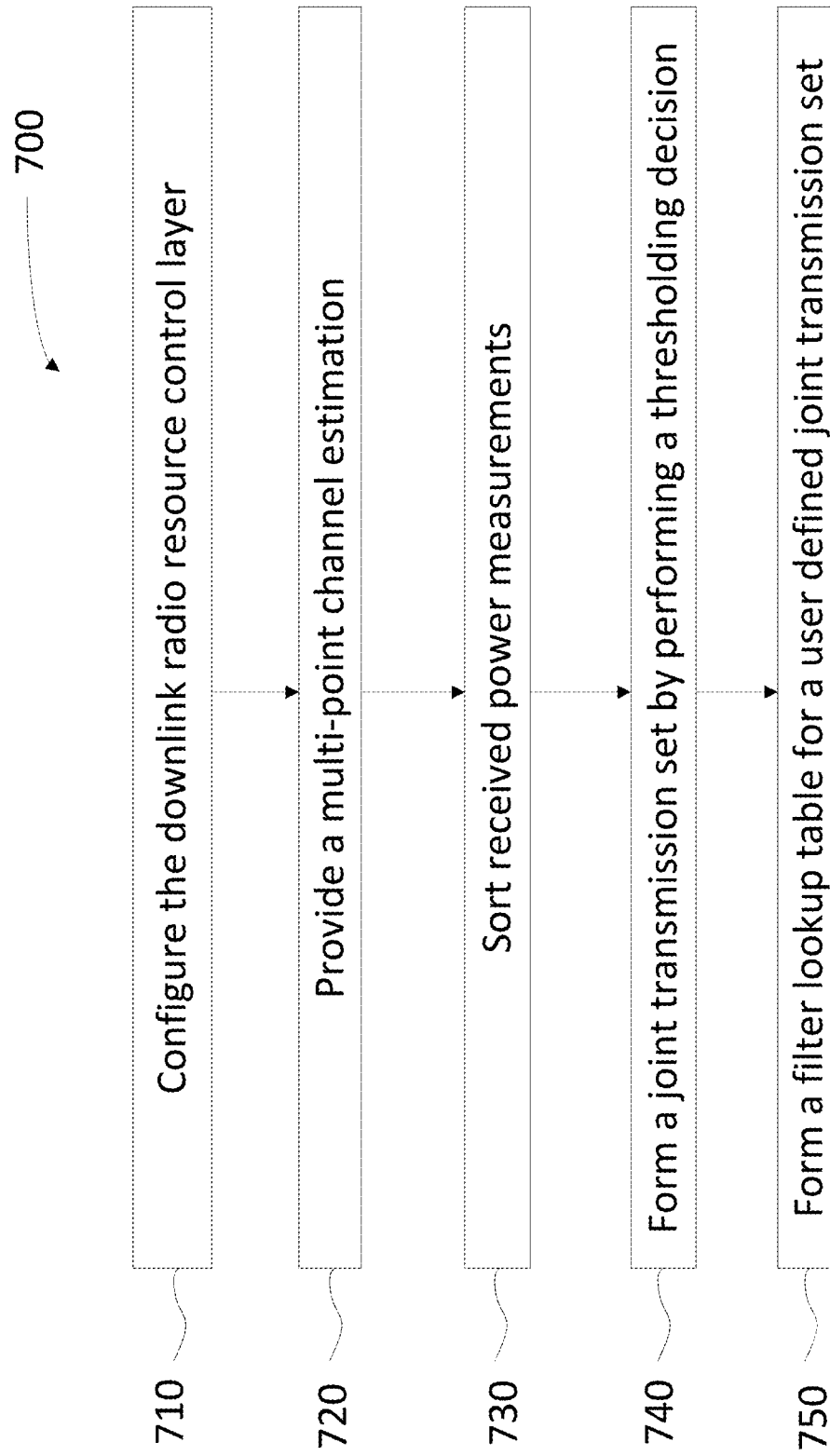
FIG. 7 illustrates a flowchart including steps in a method to adapt estimation filters, according to some embodiments.

FIG. 7 illustrates a flowchart including steps in a method 700 to adapt estimation filters according to a threshold decision. Method 700 can be performed in a downlink transmission scheme as described in detail above (cf. FIGS. 1-6).

Accordingly, steps in method 700 can be performed partially or entirely by a processor circuit executing commands and processing data stored in a memory circuit. The processor circuit and the memory circuit can be included in wireless circuitry in a network node or in a UE device in the network (e.g., network wireless circuitry 111 in serving node 106, or UE wireless circuitry 103 in UE 101, cf. FIG. 1A). Estimation filters in method 700 can include a memory span or a buffer having a time window length in a memory circuit included in the wireless circuitry.

Step 710 includes configuring a downlink radio resource control layer. Accordingly, step 710 can include providing a CoMP measurement set to a UE (e.g., CoMP measurement set 215 and UE 101, cf. FIG. 2). In some embodiments, step 710 may include receiving a list of network nodes in a measurement set provided by the serving node (e.g., CoMP measurement set 215 and serving node 106, cf. FIG. 2). In yet further embodiments step 710 may include receiving in a user equipment, from a serving node in the wireless network, a measurement set of network nodes including measurement identifiers. The measurement identifiers may include at least one of an RSRP and an RSRQ measurement identifier.

Step 710 can include selecting a number 'N' of nodes in the CoMP measurement set. The specific value of N is not limiting of embodiments consistent with the present disclosure. For example, a value N=20 has been discussed in relation to sub-frame 400, above (cf. FIG. 4). Other values for N can be possible, depending on the storage and processing capacity of the network, the serving node, and the UE. In some embodiments, step 710 can include providing a plurality of measured quantities associated with each of the nodes in the CoMP measurement set. The measured quantities can be a signal power measurement and/or a signal quality measurement. More generally, the measured quantities may be any measured reception values. In that regard, step 710 may include measuring a reception value. For example, step 710 may include the UE measuring a reference symbol (RS) received in a sub-frame of a wireless transmission (e.g., sub-frame 400, cf. FIG. 4). Accordingly, the signal power measurement can be a reference signal power (as in a RSRP configuration), and the signal quality measurement can be a received signal quality measurement (as in an RSRQ configuration). More generally, step 710 may further include determining a plurality of measurement values, each measurement value associated with a network node from the list of network nodes included in the measurement set.

Step 720 includes providing a multi-point channel estimation. For example, step 720 may include receiving at least one reference symbol from each of the network nodes in the measurement set of network nodes. Accordingly, step 720 can include calculating a Channel Status Information-Reference Symbol (CSI-RS) insertion density measure 'd(n, t)', at time 't', for each node 'n' in the CoMP measurement set. Each node can have different CSI-RS insertion density values. Insertion density for each node in CoMP measurement set can be defined as the number of CSI reference symbols for each antenna port of each CoMP measurement set member, per sub-frame (e.g., resource elements 411A, 411B, and sub-frame 400, cf. FIG. 4). In some embodiments, step 720 can also include providing a CIR function h(n,i,t) relating each node, 'n', in the CoMP measurement set, with the UE 'i', at time 't'. Accordingly, in some embodiments step 720 can include performing calculations as described for Eq. 2 above. With a channel response function h(n,i,t), step 720 can further include performing a CIR correlation calculation. For example, in a stochastic channel estimation scheme, step 720 can include performing operations as described in detail for Eq. 10. Step 720 can also include providing a time autocorrelation function and finding a correlation parameter according to Eq. 11. In some embodiments, step 720 can further include determining a coherence time $\Delta t_c$ for the channel between node 'n' and UE 'i'. The coherence time can be inversely proportional to the Doppler shift induced in the carrier frequency due to the UE velocity (e.g., UE velocity 102, cf. FIG. 1A). Accordingly, step 720 can include finding a coherence time according to Eq. 12.

Step 730 includes sorting received power measurements. In some embodiments, step 730 includes sorting the received power measurements as they are received by UE 101, without buffering the data. Further according to some embodiments, step 730 includes sorting the received power measurements in a decreasing numerical order, according to amplitude. Step 730 may also include sorting the received power measurements according to magnitude. Thus, when step 730 has been performed for all n values included in N (number of nodes included in the CoMP measurement set), a node having a highest power is selected, the node having index $n=n_{best}$.

Step 740 includes forming a transmission set by performing a threshold decision on the received power values $P_{RX}(n, t)$, as compared to the highest power value $P_{RX}(n_{best},t)$. More generally, step 740 may include selecting a plurality of network nodes in the transmission set according to the measurement values associated with the plurality of network nodes and a selected threshold. Step 740 can include performing a Boolean operation using the inequality of Eq. 17 for each node, 'n', in the CoMP measurement set:

$$|P_{RX}(n_{best},t) - P_{RX}(n,t)| \geq \nabla_{UE\_JT} \qquad (17)$$

When the above inequality holds true, step 740 can include adding node, n, to a CoMP transmission set (e.g., CoMP transmission set 225, cf. FIG. 2). When the above inequality is not true, step 740 rejects node, n, from the CoMP transmission set.

The value $\nabla_{UE\_JT}$ in Eq. 17 is a user defined threshold to predict the members of the CoMP transmission set. The user defined threshold can be selected by using a serving node clustering threshold, the standard deviation of the received power measurement errors, $\sigma_{Perr}$, resulting from channel estimation discrepancies (see discussion above), and a tuning parameter, s, as:

$$\nabla_{UE\_JT} = \nabla_{NW\_JT} + s \cdot \sigma_{Perr} \qquad (18)$$

Where $\sigma_{Perr}$ can be the standard deviation of $P_{err}(\mu,\sigma)$, according to some embodiments (cf. Eq. (5)). More generally, Eq. 18 may provide a user side threshold in terms of a standard deviation of measured value errors, where the reception values may be received quality of signal, or any other value relevant in the wireless transmission protocol. Both $\nabla_{NW\_JT}$ and $\sigma_{perr}$ are approximated by the UE using a finite buffer storing the instantaneous $\nabla_{NW\_JT}$ values observed in the recent Transmission Time Intervals (TTIs) by checking the difference between the best and the worst received powers from points performing joint Physical Downlink Shared Channel (PDSCH) transmission. By this method, the UE adapts to various network/carriers that have different clustering thresholds. UE predicted cluster threshold can be made robust to possible channel estimation errors by adding $\sigma_{perr}$ as a security margin, and can be tuned according to various multi-point channel estimation schemes. The UE may then send multi-point CSI feedback (centralized to the serving node, or decentralized to each node in the CoMP transmission set) only for CoMP measurement set nodes that satisfy n∈JT user. Different network vendors can have different configurations. For example, the network threshold ($\nabla_{NW}$) can be different between different vendors. Thus, according to the above expression for $\nabla_{UE\_JT}$, the UE finds an accurate estimate of the threshold configured in the network. In some embodiments, step 730 can include sending feedback to a plurality of nodes selected according to the above value of $\nabla_{UE\_JT}$.

In some embodiments step 740 may be performed by the UE to pursue a more aggressive down selection of transmission nodes in the CoMP transmission set. For example, in networks configured as decentralized feedback collecting networks, a combination of delay, energy efficiency, and capacity efficiency may lead to more demanding constraints on network performance. Indeed, for a decentralized feedback collecting network, the deleterious effects of delay and power loss (cf. FIGS. 6A and 6B) can be amplified by the fact that multiple network links are involved. Thus, a more aggressive down selection in step 740 can include decreasing the UE defined threshold (cf. Eq. 18). Accordingly, in embodiments where the network is configured as a centralized feedback collecting network, step 740 can include using a first UE defined threshold. And in embodiments where the network is configured as a decentralized feedback collecting network, step 740 can include using a second UE defined threshold. Accordingly, the UE may implement a more aggressive down selection by setting the second UE defined threshold to be smaller than the first UE defined threshold in step 740. For example, step 740 may include the UE selecting the 's' parameter in Eq. 18 accordingly. In some embodiments, step 740 may also include the UE adjusting the amplitude of $\sigma_{perr}$ (cf. Eq. 18). When the network is configured as a centralized feedback collecting network, the value of 's' can be higher than when the network is configured as a decentralized feedback collecting network. The adjustment of the UE defined threshold can be performed as the UE moves across different network infrastructures, including different networks. In that regard, different network infrastructures may be associated with different network vendors across different geographical areas. Thus, a UE that is carried through regions operated by different network vendors may adjust the UE defined threshold to have a seamless network performance. Further, in some embodiments step 740 may include the UE determining a first threshold in centralized CSI feedback and determining a second threshold smaller than the first threshold in decentralized CSI feedback (e.g., centralized CSI feedback 210 and decentralized CSI feedback 220, cf. FIG. 2). Accordingly, step 740 may use a centralized feedback in networks configured as centralized feedback collecting networks, and a decentralized feedback in networks configured as decentralized feedback networks.

Step 740 may also include providing a CSI feedback on at least one of the network nodes included in the transmission set to the serving node in the wireless network (e.g., centralized CSI feedback 210 and decentralized CSI feedback 220, cf. FIG. 2). Accordingly, the CSI feedback may include the joint transmission set selected in according to the thresholding decision described above. In some embodiments a decentralized CSI feedback (e.g., decentralized CSI feedback 220) is provided to a selected set of nodes in a CoMP measurement set using a decentralized threshold value. Likewise, some embodiments include a centralized CSI feedback (e.g., centralized CSI feedback 210) provided to the serving node and related to a set of nodes selected according to a centralized threshold value. Accordingly, in some embodiments step 740 includes determining a smaller decentralized threshold value relative to a centralized threshold value. In some embodiments, step 740 may further include receiving the transmission set from the serving node. The transmission set may include a plurality of network nodes selected from the measurement set. In that regard, the transmission set may be selected according to the centralized CSI feedback and the decentralized CSI feedback provided by the user equipment to the serving node.

Step 750 includes forming a filter lookup table from a user defined transmission set. Accordingly, a filter lookup table can use a binary scale with a low filter length '$m_{low}$' and a high filter length '$m_{high}$'. For example, for members of the CoMP transmission set, the filter length m(n, t) can be defined as $m_{high}$. Likewise, for nodes excluded from the CoMP transmission set, the filter length m(n, t) can be defined as $m_{low}$. Table 1 shows an example of a filter lookup table in step 750.

TABLE 1

| Node | Filter Length |
|---|---|
| $\forall$ n $\notin$ CoMP JT set | m(n, t) = $m_{low}$ |
| $\forall$ n $\in$ CoMP JT set | m(n, t) = $m_{high}$ |

Table 2 shows an example of a filter lookup table in step 750 according to some embodiments. A relation between a CIR correlation percentage and the corresponding coherence time of the channel can be written as:

$$R_h(\Delta t_{low_{chigh}}) = c_{high}, \quad (19)$$

$$\Delta t_{low_{chigh}} \geq \frac{\lambda}{2\pi v} \cdot \cos^{-1}(c_{high})$$

TABLE 2

| CIR Correlation Percentage | Coherence Time | Filter Length |
|---|---|---|
| $C_{high}$ | $\Delta t_{low}$ | $m_{low}$ |
| $C_{med}$ | $\Delta t_{med}$ | $m_{med}$ |
| $C_{low}$ | $\Delta t_{high}$ | $m_{high}$ |

Accordingly, Table 2 illustrates an embodiment of method 700 where measurements in the UE may include a correlation percentage value. The correlation percentage value may be a statistical result from CIR correlation measurements in the UE for a plurality of network nodes 'n'. Thus, each node 'n' may be 'ranked' according to the CIR correlation value for the channel linking node 'n' with UE 'i.' Accordingly, Table 2 associates a CIR correlation percentage value to a coherence time value. For example, a high correlation percentage is associated to a low coherence time and a low filter length value. Further according to some embodiments, step 750 can include determining a filter length 'm' by using a multiplicative product of the insertion density 'd(n,t)' and the coherence time $\Delta t_c$ as:

$$m(n,t) = d(n,t) \cdot \Delta t_c. \quad (20)$$

In some embodiments, method 700 to adapt estimation filters according to a threshold decision may include adapting estimation filters for a plurality of multipaths from a single node in a CoMP transmission set. Accordingly, steps 720, 730, 740, and 750 as described above may be performed to select a multipath transmission set from the plurality of multipaths associated to a single node in the CoMP transmission set. For example, step 720 may include providing multipath channel estimation for a plurality of multipaths from a single node in the CoMP transmission set. Step 730 may include sorting the received power measurements from the plurality of multipaths, to select a sub-set of the plurality of multipaths. And step 740 may include forming the multipath transmission set with the sub-set of the plurality of multi-paths. Accordingly, step 750 may include providing a lookup table from the multipath transmission set with a filter length.

Figure 8:
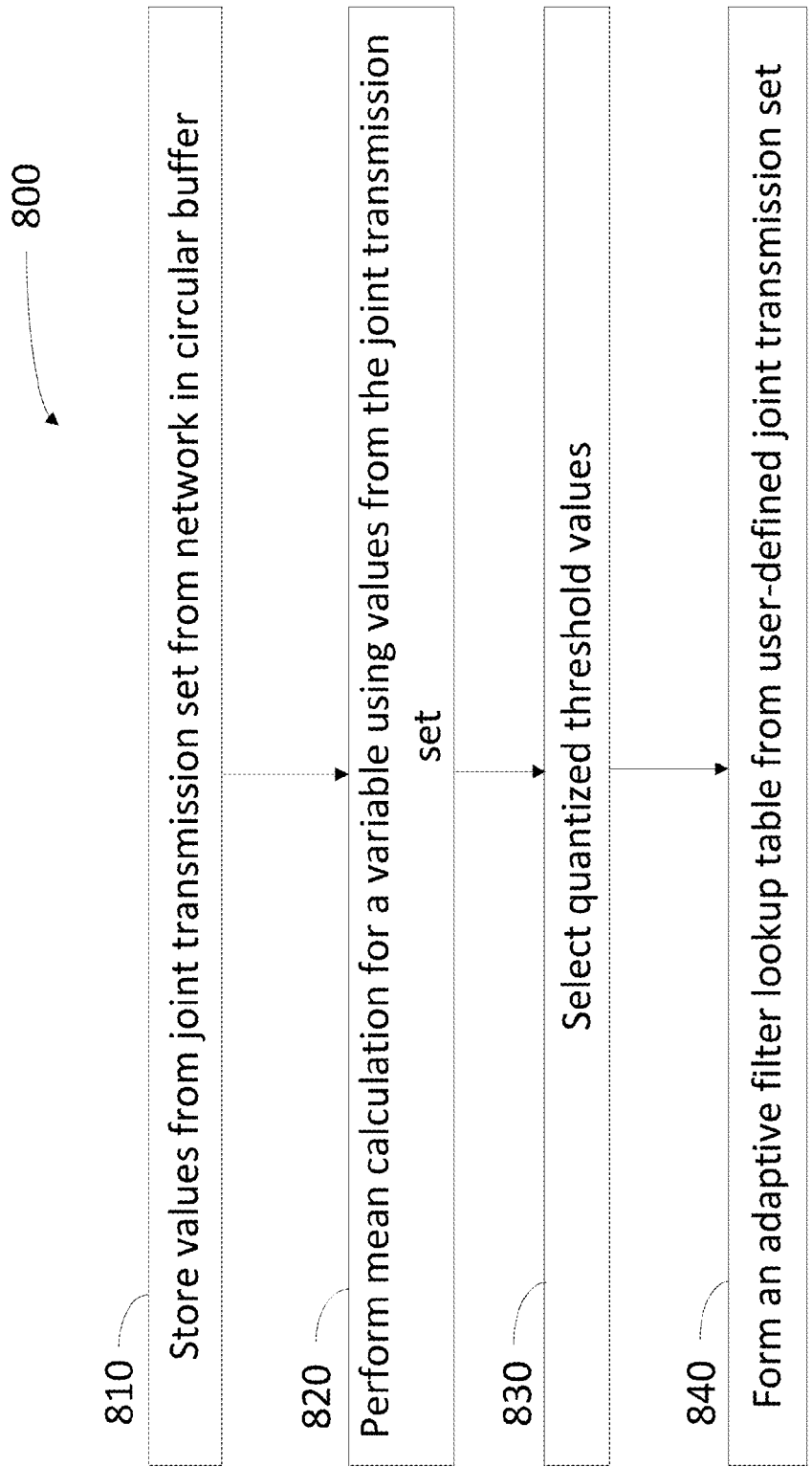
FIG. 8 illustrates a flowchart including steps in a method to adapt a memory span of multi-point channel estimation filters for use in wireless communications, according to some embodiments.

FIG. 8 illustrates a flowchart including steps in a method 800 to adapt a memory span of multi-point channel estimation filters for use in wireless communications. Method 800 includes determining a moving mean in a circular buffer, according to some embodiments. Method 800 can be performed in a downlink transmission scheme as described in detail above (cf. FIGS. 1-6). Accordingly, steps in method 800 can be performed partially or entirely by a processor circuit executing commands and processing data stored in a memory circuit. The processor circuit and the memory circuit can be included in wireless circuitry in a network node or in a UE in the network (e.g., network wireless circuitry 111 in serving node 106, or UE wireless circuitry 103 in UE 101, and network 100, cf. FIG. 1A). Method 800 can be applied to find filter lengths in a downlink communication linking the UE with a CoMP transmission set, as disclosed in embodiments herein. In that regard, method 800 can be performed in combination with method 700 (cf. FIG. 7). In particular, method 800 can be performed in combination with step 740 of method 700, which includes forming a CoMP transmission set for a given UE.

Step 810 includes storing values from a CoMP transmission set from the network in a circular buffer. The stored values {P(n,t)} can correspond to attributes of the nodes in the CoMP transmission set (e.g., CoMP transmission set 225, cf. FIG. 2). The network variable (e.g., P(n,i, t)—Eqs. 4 or 6—, C(i,t)—Eq. 7—, or E(i,t), Eq. 8) can be calculated using node-specific data such as a clustering degree for each of the nodes in the CoMP transmission set. Step 810 can include finding a clustering degree for each node in the CoMP transmission set by finding the number of active links coupled to the specific node, at a given time. The time sequence selected to store the node values in the set {P(n,t)} determines the size of the circular buffer. In some embodiments, the time sequence in the circular buffer includes node values at intervals defined by an integer number of TTI periods. The integer number of TTI periods defines a time window, Tw. For example, step 810 can include forming a circular buffer with values {P(t−1), P(t−2), . . . , P(t−Tw)}. The time unit can be selected as a TTI. One of ordinary skill will recognize that the buffer size is not limiting of embodiments consistent with the present disclosure. In some embodiments the buffer size can be 12 TTI (e.g., 12 ms). In this case, each TTI corresponds to a 1 ms sub-frame (e.g., sub-frame 400, cf. FIG. 4).

Step 820 includes performing a calculation for a network variable in each node 'n' in the CoMP transmission set. The calculation can include a mean of the network variable, such as a moving average, μ(n, t)

$$\mu(n, t) = \frac{1}{T_w} \cdot \sum_{j=1}^{T_w} P(t - j) \quad (21)$$

Step 830 can include selecting a plurality of quantized threshold values for the network variable values obtained in step 820. For example, step 830 can include determining a low ($\mu_{low}$), medium ($\mu_{mid}$), and high ($\mu_{high}$) quantized threshold value such that $\mu_{low} < \mu_{mid} < \mu_{high}$. Step 830 can also include selecting a plurality of filter length values: $m_{low}$, $m_{mid1}$, $m_{mid2}$, and $m_{high}$, such as $m_{low} < m_{mid1} < m_{mid2} < m_{high}$. Accordingly, the plurality of filter length values can be associated with the plurality of quantized threshold values such that a range of network variable values corresponds to a range of filter length values. The range of network variable values may be a range of reception values in the UE.

Step 840 can include forming an adaptive filter lookup table from a user-defined transmission set. An adaptive filter lookup table can be as Table 3 shown below. Table 3 illustrates that, depending on a resulting value of μ(n,t) for a node 'n', a filter length can be selected at time 't', for node 'n' in the CoMP transmission set. More generally, step 840 can include associating a range of network variable values to a range of filter length values. In some embodiments, such as when the network variable is a node clustering degree (number of nodes in active communication with node 'n'), the association can be proportional. That is, a lower range of node clustering degree values can be associated to a lower range of filter length values. One of ordinary skill will recognize that the specific number of ranges is not limiting of embodiments consistent with the present disclosure.

TABLE 3

| Quantized Threshold | Adaptive Filter Length |
| --- | --- |
| $\mu(n, t) < \mu_{low}$ | $m(n, t) = m_{low} \;\forall\; n \in$ CoMP JT |
| $\mu_{low} \leq \mu(n, t) < \mu_{mid}$ | $m(n, t) = m_{mid1} \;\forall\; n \in$ CoMP JT |
| $\mu_{mid} \leq \mu(n, t) < \mu_{high}$ | $m(n, t) = m_{mid2} \;\forall\; n \in$ CoMP JT |
| $\mu_{high} \leq \mu(n, t)$ | $m(n, t) = m_{high} \;\forall\; n \in$ CoMP JT |

In accordance with some embodiments, channel estimation filters with longer memory spans are chosen for UEs that have higher values of the network variable. Embodiments of method 800 enable higher performance improvement for downlink communication with the UE by providing longer channel estimation filters to nodes having high clustering degrees. In some embodiments applying a quantized threshold table to nodes that belong to a CoMP transmission set (e.g., Table 3) can result in a more efficient use of network resources. Indeed, in such embodiments the filter lengths can be increased for a limited set of nodes. The CoMP transmission set can be a sub-set of the CoMP measurement set (e.g., CoMP transmission set 225 and CoMP measurement set 215, cf. FIG. 2). Step 840 can include providing to the UE an option to further select nodes from the transmission set. For example, the UE can decide to drop some of the nodes selected in a subsequent transmission set by serving node 106 in step 830. In some embodiments, the circular buffer in step 810 may be a 'history buffer', and the time window $T_w$ in Eq. 21 and step 810 corresponds to a length of the history buffer. Accordingly, in some embodiments the length of the history buffer ($T_w$) for a given channel may be longer than the filter length associated with that channel. Moreover, in some embodiments the length of the history buffer ($T_w$) may be adaptively selected to each node 'n' in the CoMP transmission set.

In some embodiments, method 800 to adapt a memory span may be used for a plurality of multipaths from a single node in a CoMP transmission set. Accordingly, steps 810, 820, 830, and 840 as described above may be performed to select a multipath transmission set from the plurality of multipaths associated to a single node in the CoMP transmission set. Thus, step 810 may include storing values from the multipath transmission set in a circular buffer. Step 820 may include performing a mean calculation for a variable using the stored values from the multipath transmission set. And step 830 may include selecting quantized threshold values from the mean calculation in step 820. Accordingly, step 840 may include providing an adaptive filter lookup table from the user-defined multipath transmission set with a filter length.

Figure 9:
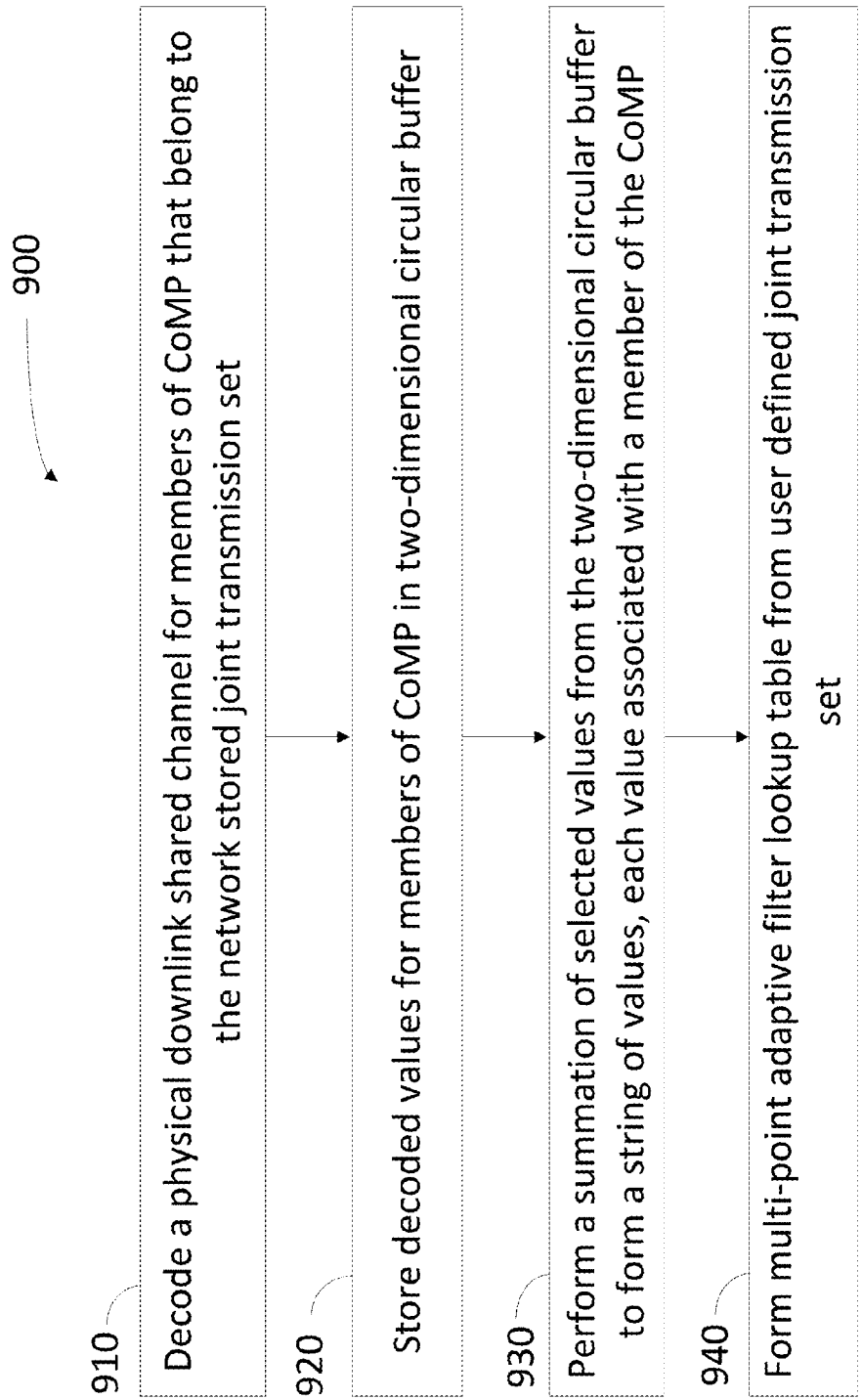
FIG. 9 illustrates a flowchart including steps in a method to dynamically adapt a memory span of multi-point channel estimation filters for use in wireless communications, according to some embodiments.

FIG. 9 illustrates a flowchart including steps in a method 900 to dynamically adapt a memory span of multi-point channel estimation filters for use in wireless communications, according to some embodiments. Method 900 can include determining a two dimensional circular buffer, according to some embodiments. Method 900 can be performed in a downlink transmission scheme as described in detail above (cf. FIGS. 1-6). Accordingly, steps in method 900 can be performed partially or entirely by a processor circuit executing commands and processing data stored in a memory circuit. The processor circuit and the memory circuit can be included in wireless circuitry in a network node or in a UE in the network (e.g., network wireless circuitry 111 in serving node 106, or UE wireless circuitry 103 in UE 101, cf. FIG. 1A). Method 900 can be applied to dynamically adapt filter lengths in a downlink communication linking the UE with a CoMP transmission set, as disclosed in embodiments herein. In that regard, method 900 can be performed in combination with method 700 (cf. FIG. 7). In particular, method 900 can be performed in combination with step 740 of method 700, which includes forming a transmission set for a given UE. The transmission set can be as CoMP transmission set 225 (cf. FIG. 2), stored by the memory circuit in serving node 106.

Step 910 includes decoding a PDSCH for network nodes belonging to a network-provided CoMP transmission set. For example, step 910 can include defining a time varying Boolean variable (e.g., 0="false", 1="true") for each node 'n' in a CoMP measurement set, x(n,t). The CoMP measurement set can be provided to the UE by the serving node (e.g., CoMP measurement set 215, cf. FIG. 2). Accordingly, step 910 can include assigning x(n,t)=1 when node 'n' in the CoMP measurement set also belongs to a CoMP transmission set at time 't' (e.g., CoMP transmission set 225, cf. FIG. 2). Accordingly, the CoMP transmission set in step 910 can be stored in the network. For example, the CoMP transmission set can be stored by a memory circuit in the serving node. In some embodiments, step 910 also includes assigning x(n,t)=1 when node 'n' participates in PDSCH transmission at time 't'. Step 910 also includes setting x(n,t)=0 when node 'n' is excluded from the CoMP transmission set, or when node 'n' shows no PDSCH activity at time 't'.

Step 920 includes storing the decoded values of the CoMP measurement set x(n,t) in a two-dimensional circular buffer. A first dimension in the two-dimensional circular buffer corresponds to the node assignment 'n', and a second dimension corresponds to time, 't'. The size of the buffer along the second dimension (time) can be selected by a time window $T_w$, similar to step 810 in method 800 (cf. FIG. 8). Accordingly, step 920 can include forming a two dimensional buffer having a size: $N \times T_w$ (where 'N' is the size of the CoMP measurement set and time Tw is measured in integral numbers of TTIs).

Step 930 includes performing a summation of selected valued from the two dimensional circular buffer to form a string of values. Each value in the string can be associated with a member of the CoMP transmission set. For example, the contents x(n,t) of the circular buffer stored in step 920 are sent to a summation block that can sum along the second dimension (time) of the buffer to form a string Y(n), as follows:

$$Y(n) = \Sigma_t^{T_w} x(n,t) \quad (22)$$

Accordingly, in some embodiments the value Y(n) can indicate the recurrence of node 'n' in the CoMP transmission set of UE 'i' throughout a history encompassing time window Tw. Thus, in some embodiments step 930 may include determining a historical recurrence of a network node in the CoMP transmission set during the time window. In some embodiments, the circular buffer in steps 920 and 930 may be a 'history buffer', and the time window $T_w$ in Eq. 22 may correspond to a length of the history buffer. Accordingly, in some embodiments the length of the history buffer ($T_w$) for a given channel may be longer than the filter length associated with that channel. In that regard, the length of the 'history buffer' may be increased in the time dimension relative to the filter length because the information stored in the history buffer may be a single string of bits (e.g., Boolean variable x(n,t)), for each channel. Thus, in some embodiments the memory constraints for the history buffer may be more relaxed than for the filter length.

Step 940 can include forming a multi-point adaptive filter lookup table from a user-defined CoMP transmission set. An example of a multi-point adaptive filter lookup table is shown below in Table 4, where CoMP JT represents the user-defined CoMP transmission set. Accordingly, step 940 can include determining a plurality of discrete values $Y_{low}$, $Y_{mid}$, and $Y_{high}$ for the Y(n) variable in Eq. 22, such as $Y_{low} < Y_{mid} < Y_{high}$. Step 940 can also include selecting a plurality of filter length values: $m_{low}$, $m_{mid1}$, $m_{mid2}$, and $m_{high}$, such as $m_{low} < m_{mid1} < m_{mid2} < m_{high}$. The values $m_{low}$, $m_{mid1}$, $m_{mid2}$, and $m_{high}$ can be unrelated to similar values in step 830 discussed in the context of method 800 (cf. FIG. 8). Obtained values of Y(n) for each measured point may be used in the multi-point adaptive filter length lookup table.

TABLE 4

Multi-Point Adaptive Filter Length $m(n, t) = m_{low}$, $\forall$ n ∈ CoMP JT: $Y_n < Y_{low}$
$m(n, t) = m_{mid1}$, $\forall$ n ∈ CoMP JT: $Y_{low} \leq Y_n < Y_{mid}$
$m(n, t) = m_{mid2}$, $\forall$ n ∈ CoMP JT: $Y_{mid} \leq Y_n Y_{high}$
$m(n, t) = m_{high}$, $\forall$ n ∈ CoMP JT: $Y_{high} < Y_n$ Step 940 can also include estimating channel impulse responses corresponding to the nodes that actively participated in joint PDSCH transmission in recent TTIs. In some embodiments, step 940 includes smoothing the estimated channel impulse responses. Step 940 can also include predicting channel impulse responses. In that regard, selecting filters with longer memory spans can provide for formulating more accurate CIR predictions based on historical data. Step 940 can include providing smoothed values and/or predicted values for the channel impulse response to the UE. While the smoothing and predicting calculations can be performed in step 940 by the serving node, the UE can further select nodes in the CoMP transmission set. For example, the UE can decide to drop some of the nodes used in the transmission set through step 930, provided by the serving node. The UE can then provide feedback to selected nodes in the network, avoiding delays in network return service. Additional detail is described in method 1000 below.

In some embodiments, method 900 may be used to dynamically adapt a memory span for a plurality of multi-paths from a single node in a CoMP transmission set. Accordingly, steps 910, 920, 930, and 940 as described above may be performed to select a multipath transmission set from the plurality of multipaths associated to a single node in the CoMP transmission set. Thus, step 910 may include decoding a PDSCH for each of the multipaths in a node selected from the CoMP transmission set. Step 920 may include storing the decoded values from each of the multipaths in a two-dimensional buffer. Step 930 may include performing a summation of selected values from the two-dimensional buffer to form a string of values. Each value in the string of values is associated with a multipath from a single node selected form the CoMP transmission set. Step 930 may also include forming a user-defined multipath transmission set. And step 940 may include forming a multipath adaptive filter lookup table from the user defined multipath transmission set.

Figure 10:
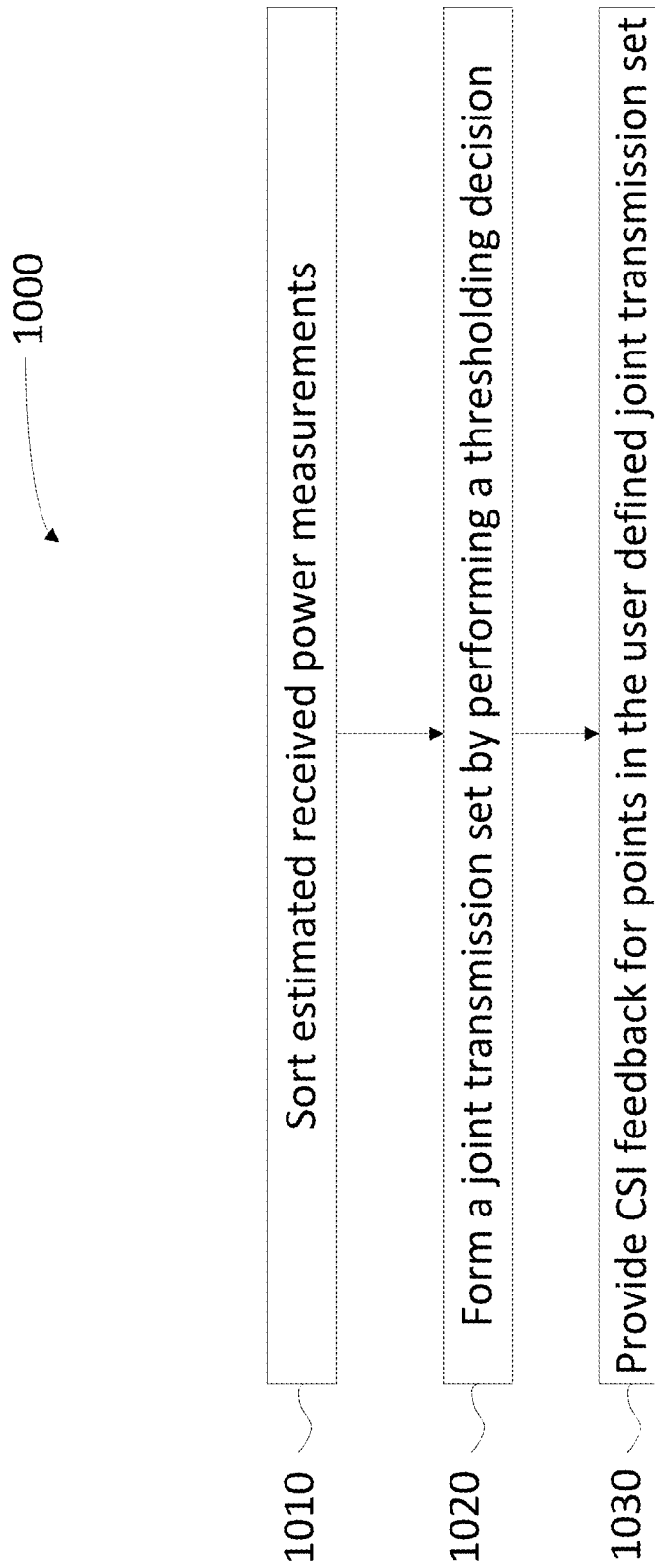
FIG. 10 illustrates a flowchart including steps in a method to form a transmission set, according to some embodiments.

FIG. 10 illustrates a flowchart including steps in a method 1000 to form a CoMP transmission set with a threshold decision, according to some embodiments. Method 1000 can be performed in a downlink transmission scheme as described in detail above (cf. FIGS. 1-6). Accordingly, steps in method 1000 can be performed partially or entirely by a processor circuit executing commands and processing data stored in a memory circuit. The processor circuit and the memory circuit can be included in wireless circuitry in a UE (e.g., UE wireless circuitry 103 in UE 101, cf. FIG. 1A). For example, steps in method 1000 can be partially or entirely performed by a UE in step 840 of method 800 or in step 940 of method 900 (cf. FIGS. 8 and 9).

Step 1010 includes sorting estimated received power measurements. The estimated received power measurements can include smoothed power values for each node 'n' belonging to a CoMP transmission set provided by the serving node. Accordingly, the smoothing of the power values can include averaging and other filtering operations performed on CIR data using selected filters. The selected filters can be selected using lookup tables according to method 800 or method 900. Other than derivation of the power values used in step 1010, step 1010 can be as step 730 described in detail above, in relation to method 700. Step 1020 includes forming a CoMP transmission set by performing a thresholding decision. Accordingly, step 1020 can be as step 740 described in detail in reference to method 700 (cf. FIG. 7).

Step 1030 includes providing CSI feedback for nodes in the user defined CoMP transmission set as formed in step 1020. CSI feedback may be provided by the UE to nodes in the user CoMP transmission set. Accordingly, step 1030 can include providing decentralized CSI feedback, in embodiments including a DL-CoMP transmission scheme as disclosed herein (e.g., decentralized CSI feedback 220, cf. FIG. 2). In some embodiments, step 1030 may include determining a history of a network node in the transmission set during the time window. A history of the network node may include the CSI feedback data provided by the UE on the network node for a period of time, such as a time window. For example, a history of the network node 'n' may include a moving average Y(n) of Boolean variable, x(n,t), for time 't' within time window $T_w$ (cf. Eq. 22).

Method 1000 can reduce requirements for an uplink payload including CSI feedback (e.g., the uplink payload of CSI feedback 220, cf. FIG. 2). Method 1000 can also reduce processing and clustering decision making for the serving node by performing a down-selection of the CoMP transmission set for the upcoming TTI. Indeed, according to method 1000, CSI feedback for nodes that are less likely to be part of the CoMP transmission set are not transferred between the CoMP nodes 105 and serving node 106. This configuration avoids unnecessary processing by the UE and elements of the network (e.g., serving node 106 and nodes 105, cf. FIG. 1A). As a result, clustering decisions can be more accurate due to the use of more up-to-date CSI feedback at the time of PDSCH transmission.

In some embodiments, method 1000 may be used to form a multipath transmission set for a single node selected from a CoMP transmission set. Thus, step 1010 may include sorting estimated received power measurements from a plurality of multipaths associated with a single node selected from the CoMP transmission set.

Step 1020 may include forming the multipath transmission set by performing a thresholding decision on the power measurements received from each of the multipaths, sorted in step 1010. And step 1030 may include providing CSI feedback for each of the multipaths in the user-defined multipath transmission set. In some embodiments, method 1000 may be used to form a multipath transmission set for each node in a subset of nodes, e.g., the subset of nodes including a plurality of nodes, selected from a CoMP transmission set. Step 1010 may include sorting estimated received power measures for a plurality of multipaths for each node in the subset of nodes. Step 1020 may include forming a multipath transmission set for each node by performing a thresholding decision on the sorted estimated power measurements. Step 1030 may include providing CSI feedback for each of the multipaths for each of the nodes in the subset of nodes.

Figure 11:
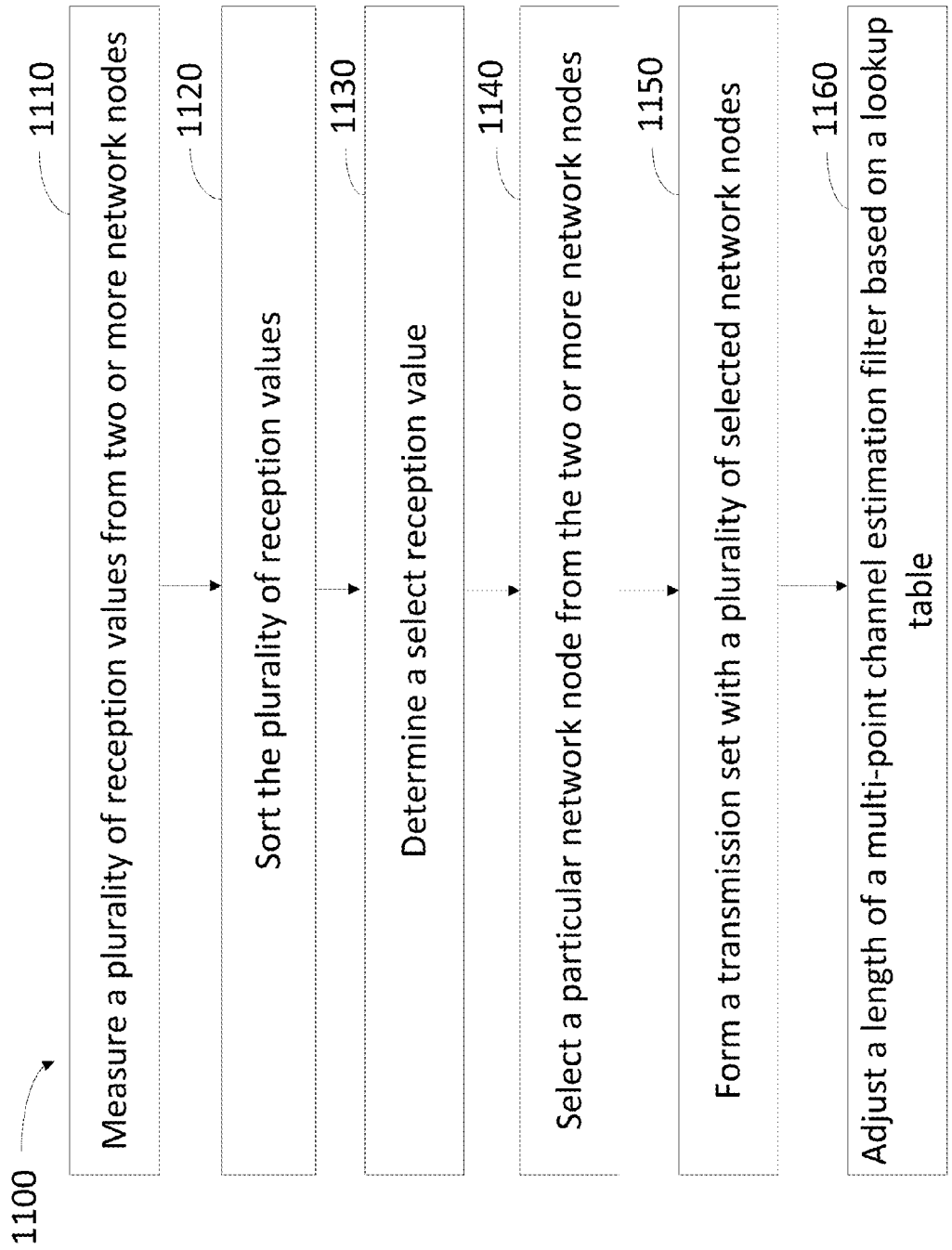
FIG. 11 illustrates a flowchart including steps in a method to adapt a memory span of multi-point channel estimation filters for use in wireless communications, according to some embodiments.

FIG. 11 illustrates a flowchart including steps in a method 1100 to adapt a memory span of multi-point channel estimation filters for use in wireless communications, according to some embodiments. Method 1100 can be performed in a downlink transmission scheme as described in detail above (cf. FIGS. 1-6). Accordingly, steps in method 1100 can be performed partially or entirely by a processor circuit executing commands and processing data stored in a memory circuit. The processor circuit and the memory circuit can be included in wireless circuitry in a network node or in a UE in the network (e.g., network wireless circuitry 111 in serving node 106, or UE wireless circuitry 103 in UE 101, cf. FIG. 1A).

Step 1110 may include measuring a plurality of reception values from two or more network nodes at a wireless communication device. The plurality of reception values measured in step 1110 may include a plurality of complex CIR values for a specific transmission channel. Step 1120 may include sorting the plurality of measured reception values according to magnitude. In that regard, step 1120 may include similar or the same operations as described in detail above with regard to step 730 in method 700 (cf. FIG. 7). The magnitude in step 1120 may be formed from the magnitude of the complex CIR values measured in step 1110. Step 1130 may include determining a select reception value. The select reception value may be the largest magnitude value from the set of measured reception values in step 1120. Step 1140 may include selecting a particular network node from the two or more network nodes based on a reception value associated with the selected network node, the reception value within a predetermined threshold from the select reception value. Step 1150 may include forming a transmission set with a plurality of selected network nodes. In that regard, step 1150 may include similar or the same operations as described in detail above with respect to step 740 in method 700 (cf. FIG. 7). Step 1160 can include adjusting a length of a multi-point channel estimation filter based on a lookup table. In some embodiments, step 1160 may include adjusting a filter length for the selected network node in accordance with the lookup table and the transmission value associated with the selected network node. Accordingly, step 1160 may include forming the lookup table as described in detail above with regard to methods 700, 800, and 900 (cf. Tables 1, 2, 3, and 4).

In some embodiments, method 1100 may be used to adapt a memory span of a channel estimation filter for a plurality of multipaths. The plurality of multipaths may include two or more multipaths linking a network node to the UE (e.g., multipaths 121 and 122, and UE 101 cf. FIG. 1B). Thus, step 1110 may include measuring a plurality of reception values from the plurality of multipaths associated with one network node. Step 1120 may include sorting the plurality of reception values following operations similar to those described in relation to step 730 in method 700 (cf. FIG. 7). Step 1130 may include determining a select reception value. Step 1140 may include selecting a particular multipath from the plurality of multipaths associated with the network node. And step 1160 may include associating a filter length for each of the two or more multipaths in the plurality of multipaths. Accordingly, in some embodiments it may be desirable to have a different filter length for each of the two or more multipaths in order to save computational complexity and increase power efficiency of the wireless network.

Figure 12:
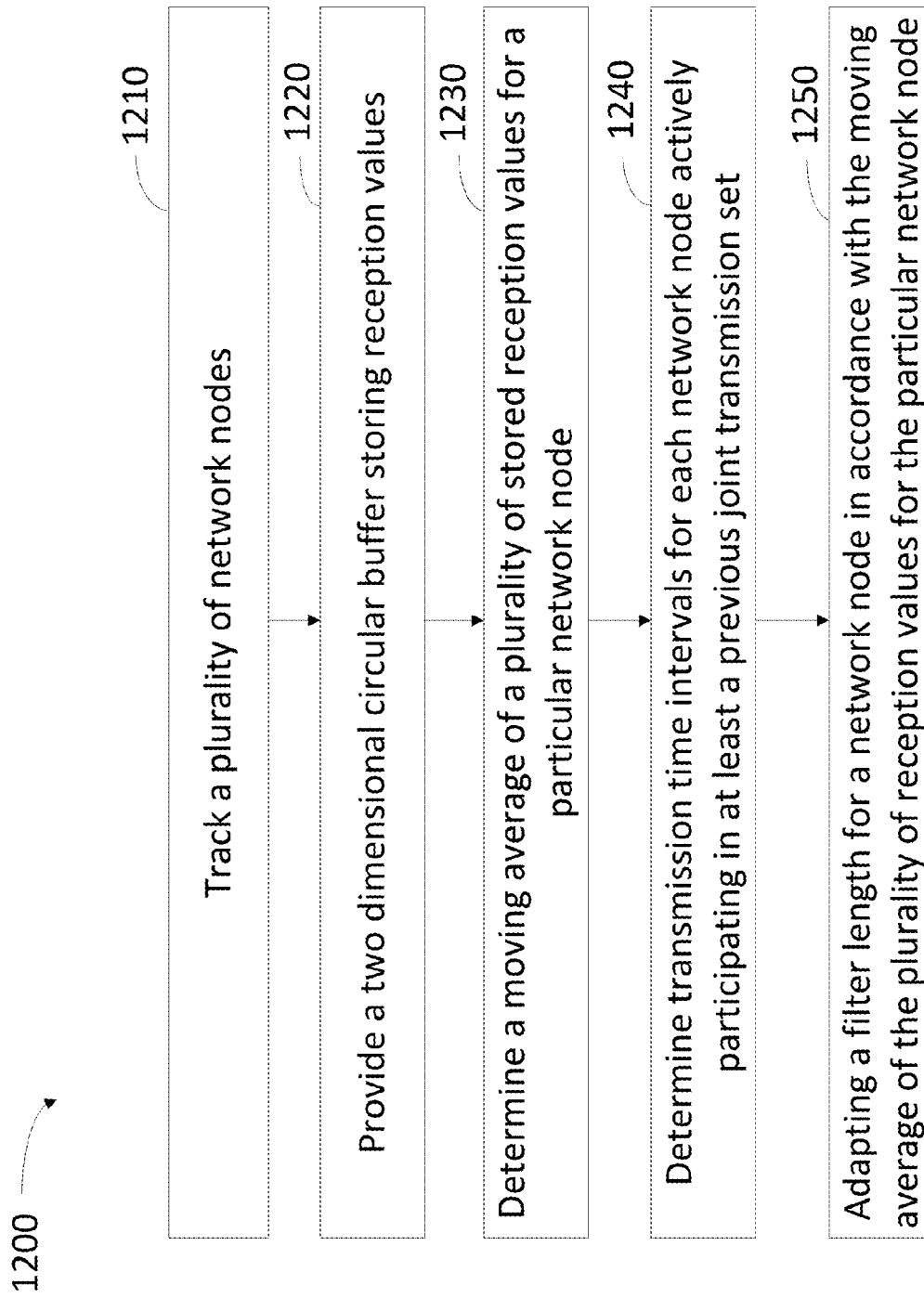
FIG. 12 illustrates a flowchart including steps in a method to adapt a filter length of multi-channel estimation filters for use in wireless communications, according to some embodiments.

FIG. 12 illustrates a flowchart including steps in a method 1200 to adapt a filter length of multi-channel estimation filters for use in wireless communications, according to some embodiments. Method 1200 can include determining a two dimensional circular buffer, according to some embodiments. Method 1200 can be performed in a downlink transmission scheme as described in detail above (cf. FIGS. 1-6). Accordingly, steps in method 1200 can be performed partially or entirely by a processor circuit executing commands and processing data stored in a memory circuit. The processor circuit and the memory circuit can be included in wireless circuitry in a network node or in a UE in the network (e.g., network wireless circuitry 111 in serving node 106, or UE wireless circuitry 103 in UE 101, cf. FIG. 1A).

Step 1210 may include tracking a plurality of network nodes in a joint transmission set. Step 1220 may include providing a two dimensional circular buffer for storing reception values from the plurality of network nodes in the joint transmission set over a time window. In that regard, step 1220 may be as described in detail above in relation to step 920 in method 900 (cf. FIG. 9).

Step 1230 may include determining a moving average of the stored reception values for a particular network node included in the joint transmission set. In that regard, step 1230 may include similar or the same operations as described in detail above, with reference to step 820 in method 800 (cf. FIG. 8). Step 1240 may include determining transmission time intervals (TTIs) for each network node actively participating in at least a previous joint transmission set. Step 1250 may include adapting a filter length for a network node in the joint transmission set in accordance with the moving average of the plurality of reception values for the particular network node. Accordingly step 1250 may include forming and using an adaptive filter lookup table as described in detail above, in relation to methods 700, 800, and 900 (cf. Table 1, 2, 3, and 4).

Figure 13:
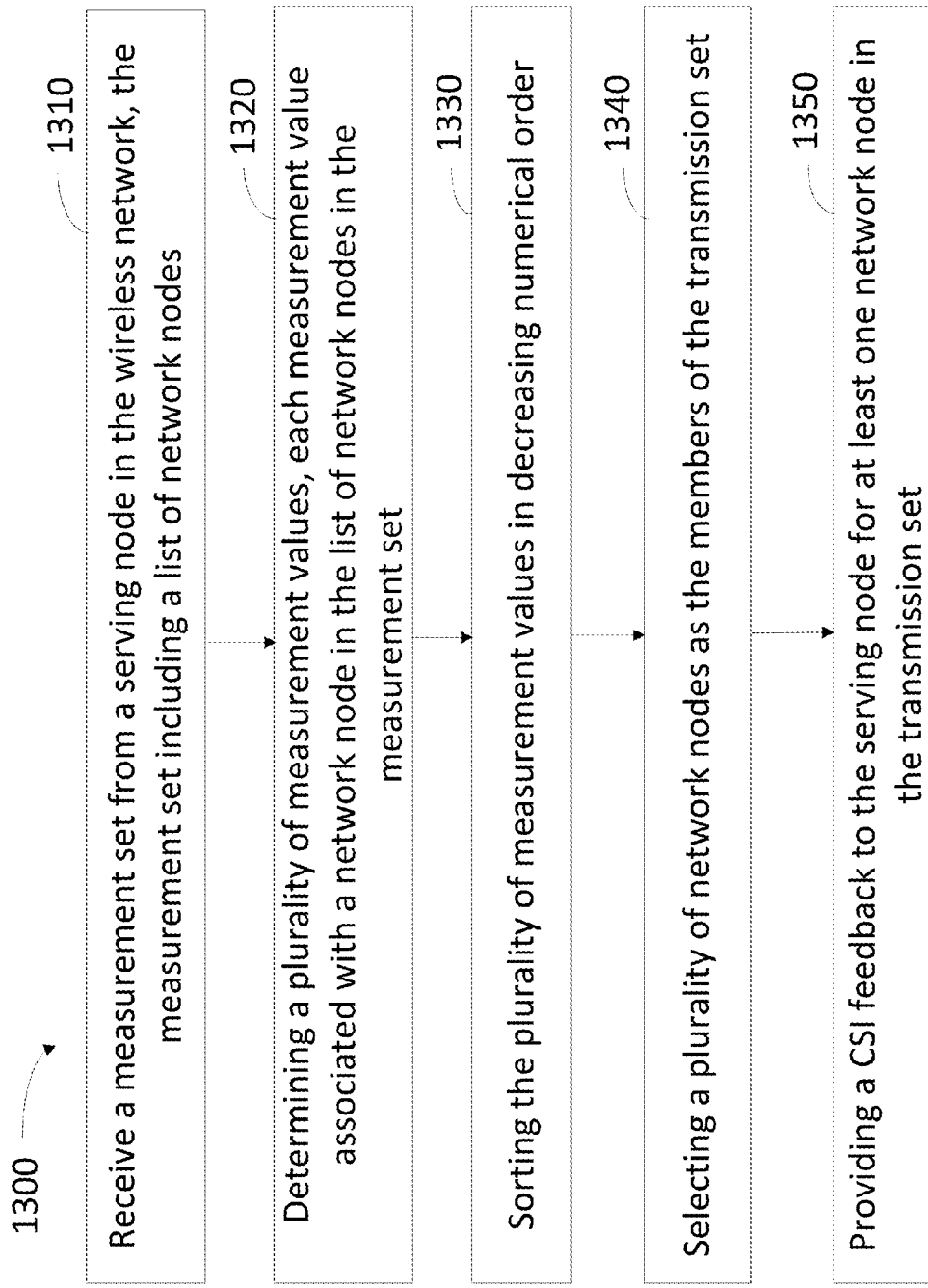
FIG. 13 illustrates a flowchart including steps in a method to select members of a transmission set in a wireless network, according to some embodiments.

FIG. 13 illustrates a flowchart including steps in a method 1300 to select members of a transmission set in a wireless network, according to some embodiments. Method 1300 can be performed in a downlink transmission scheme as described in detail above (cf. FIGS. 1-6). Accordingly, steps in method 1300 can be performed partially or entirely by a processor circuit executing commands and processing data stored in a memory circuit. The processor circuit and the memory circuit can be included in wireless circuitry in a network node or in a UE in the network (e.g., network wireless circuitry 111 in serving node 106, or UE wireless circuitry 103 in UE 101, cf. FIG. 1A).

Step 1310 can include receiving a measurement set from a serving node in the wireless network, the measurement set including a list of network nodes. Step 1320 can include determining a plurality of measurement values. According to some embodiments, each measurement value in the plurality of measurement values being associated with a network node in the list of network nodes included in the measurement set. Step 1330 can include sorting the plurality of measurement values in decreasing numerical order. Step 1340 can include selecting a plurality of network nodes as the members of the transmission set according to the plurality of measurement values associated with the list of network nodes and according to a threshold. And step 1350 can include providing a channel status information (CSI) feedback to the serving node for at least one network node in the plurality of network nodes included in the transmission set.

Representative applications of methods and apparatus according to the present application are described in this disclosure. These examples are being provided solely to add context and aid in the understanding of the described embodiments. It will thus be apparent to one skilled in the art that the described embodiments can be practiced without some or all of these specific details. In other instances, well known process steps have not been described in detail in order to avoid unnecessarily obscuring the described embodiments. Other applications are possible, such that the following examples should not be taken as limiting.

In the above detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments can be used, and changes can be made without departing from the spirit and scope of the described embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A method to configure a set of multi-point channel estimation filters for use by a wireless communication device, the method comprising:
    measuring at the wireless communication device a plurality of reception values for signals received from a set of two or more network nodes of a wireless network, each reception value in the plurality of reception values associated with a corresponding network node in the set of two or more network nodes;
    selecting a particular network node from the set of two or more network nodes based on the reception value associated with the particular network node;
    calculating a coherence time value for a channel between the particular network node and the wireless communication device based on a velocity of the wireless communication device; and
    adjusting a length of a multi-point channel estimation filter associated with the particular network node based on a filter lookup table and on the calculated coherence time value for the channel between the particular network node and the wireless communication device,
    wherein the filter lookup table associates filter length values with coherence time values and comprises at least:

a low filter length value associated with a first range of coherence time values, and a high filter length value that exceeds the low filter length value and is associated with a second range of coherence time values that exceed the first range of coherence time values.

2. The method of claim 1, wherein measuring at the wireless communication device the plurality of reception values for signals received from the set of two or more network nodes of the wireless network comprises measuring at the wireless communication device a received signal power and/or a received signal quality for signals received from the set of two or more network nodes.

3. The method of claim 1, wherein measuring at the wireless communication device the plurality of reception values for signals received from the set of two or more network nodes of the wireless network comprises measuring at the wireless communication device reception values for two or more multipaths linking the particular network node to the wireless communication device, and wherein adjusting the length of the multi-point channel estimation filter associated with the particular network node further comprises associating a filter length value with each of the two or more multipaths.

4. The method of claim 1, further comprising:
at the wireless communication device:
determining a moving average of a set of reception values for signals received from the particular network node in the set of two or more network nodes over a time window; and
determining a historical recurrence of the particular network node during the time window.

5. The method of claim 4, wherein a length of the time window is less than the calculated coherence time value for the channel between the particular network node and the wireless communication device.

6. The method of claim 4, further comprising:
at the wireless communication device:
storing the set of reception values in a circular buffer; and
determining the moving average of the set of reception values using the set of reception values stored in the circular buffer for the particular network node.

7. The method of claim 5, further comprising:
at the wireless communication device:
determining a correlation function using the plurality of reception values; and
selecting a size of the circular buffer based on the calculated coherence time value,
wherein the wireless communication device calculates the coherence time value based on the correlation function and the velocity of the wireless communication device.

8. The method of claim 7, wherein determining the correlation function using the plurality of reception values comprises determining a channel impulse response by selecting the plurality of reception values according to at least one characteristic including at least one of a subcarrier frequency and a multipath between the particular network node and the wireless communication device.

9. The method of claim 1, wherein the filter lookup table further associates coherence time values with channel impulse response (CIR) correlation values.

10. A user equipment configurable for operation in a wireless network, the user equipment comprising:
wireless circuitry comprising a receiver and a transmitter;
a memory circuit configured to store data, including a filter lookup table, and commands; and
a processor circuit configured to, upon execution of the commands, cause the user equipment to:
receive an information message from a network serving node, the information message comprising a list of a plurality of measurement nodes in the wireless network;
perform a plurality of measurements on signals received from network nodes in the plurality of measurement nodes;
select a plurality of transmission nodes from the plurality of measurement nodes to form a joint transmission set based on the plurality of measurements on signals received from the network nodes; and
select a filter length for each transmission node in the plurality of transmission nodes based on the filter lookup table, which associates filter lengths with measurement values for the plurality of measurements, wherein measurement values for the plurality of measurements include correlation percentage values associated with coherence times of channels between the user equipment and the plurality of transmission nodes, and the filter lookup table comprises at least:
a low filter length value associated with a first range of coherence values, and
a high filter length value that exceeds the low filter length value and is associated with a second range of coherence time values that exceed the first range of coherence time values.

11. The user equipment of claim 10, wherein the processor circuit is further configured to, upon execution of the commands, cause the user equipment to determine correlation percentage values by estimating a channel impulse response using a plurality of channel reception values, each channel reception value in the plurality of channel reception values associated with a characteristic including at least one of a subcarrier frequency and a multipath linking one of the network nodes with the user equipment.

12. The user equipment of claim 10, wherein the processor circuit is further configured to, upon execution of the commands, cause the user equipment to:
determine a coherence time for each transmission node in the plurality of transmission nodes;
determine an insertion density for each transmission node in the plurality of transmission nodes; and
determine a multiplicative product of the insertion density and the coherence time for each transmission node in the plurality of transmission nodes to use for selection of the filter length for the corresponding transmission node in the plurality of transmission nodes.

13. The user equipment of claim 10, wherein the user equipment performs the plurality of measurements on signals received from network nodes in the plurality of network nodes by measuring a received signal power and/or a received signal quality for the signals received from the network nodes in the plurality of network nodes.

14. The user equipment of claim 10, wherein the user equipment is further configured to determine a coherence time for each transmission node in the plurality of transmission nodes based on a velocity of the user equipment.

15. The user equipment of claim 10, wherein the filter lookup table further associates coherence time values with channel impulse response (CIR) correlation values.

16. A non-transitory computer-readable medium storing executable instructions that, when executed by one or more processors of a wireless communication device, cause the wireless communication device to:

measure at the wireless communication device a plurality of reception values for signals received from a plurality of network nodes of a wireless network, each reception value associated with a corresponding network node;

select a particular network node based on the reception value associated with the particular network node;

calculate a coherence time value for a channel between the particular network node and the wireless communication device; and adjust a length of a filter associated with the particular network node based on a filter lookup table and on the calculated coherence time value, wherein the filter lookup table associates filter length values with coherence time values and comprises at least:
  a low filter length value associated with a first range of coherence time values, and
  a high filter length value that exceeds the low filter length value and is associated with a second range of coherence time values that exceed the first range of coherence time values.

17. The non-transitory computer-readable medium of claim 16, wherein the wireless communication device calculates the coherence time value based on a velocity of the wireless communication device.

18. The non-transitory computer-readable medium of claim 16, wherein the plurality of reception values comprise measurements of a received signal power and/or a received signal quality for signals received from the plurality of network nodes.

19. The non-transitory computer-readable medium of claim 16, wherein the executable instructions, when executed by the one or more processors of the wireless communication device, further cause the wireless communication device to:
  determine a correlation function using the plurality of reception values,
  wherein the wireless communication device calculates the coherence time value based on the correlation function.

20. The non-transitory computer-readable medium of claim 16, wherein the filter lookup table further associates coherence time values with channel impulse response (CIR) correlation values.

* * * * *